(12) United States Patent
Chen et al.

(10) Patent No.: US 12,436,002 B2
(45) Date of Patent: Oct. 7, 2025

(54) MEDICAL DEVICE AND SYSTEM AND METHOD FOR GUIDING POSITIONING OF SAME

(71) Applicants: THE UNIVERSITY OF MELBOURNE, Victoria (AU); THE HONG KONG POLYTECHNIC UNIVERSITY, Kowloon (HK)

(72) Inventors: Bernard Chen, Victoria (AU); Jean-Marc Gerard, Victoria (AU); Arvind Kumar N Vadivelu, Victoria (AU); Denny Nurjanto Oetomo, Victoria (AU); Stephen John O'Leary, Victoria (AU); Hwa-Yaw Tam, Kowloon (HK); Zhengyong Liu, Kowloon (HK); Dinusha Serandi Gunawardena, Kowloon (HK)

(73) Assignees: The University of Melbourne;, Victoria (AU); The Hong Kong Polytechnic University, Kowloon (HK)

( * ) Notice: Subject to any disclaimer, the term of this patent is extended or adjusted under 35 U.S.C. 154(b) by 419 days.

(21) Appl. No.: 17/757,949

(22) PCT Filed: Dec. 23, 2020

(86) PCT No.: PCT/AU2020/051424
§ 371 (c)(1),
(2) Date: Jun. 24, 2022

(87) PCT Pub. No.: WO2021/127738
PCT Pub. Date: Jul. 1, 2021

(65) Prior Publication Data
US 2023/0028220 A1    Jan. 26, 2023

(30) Foreign Application Priority Data
Dec. 24, 2019 (AU) .................................. 2019904938

(51) Int. Cl.
*G01D 5/353* (2006.01)
*G01K 11/3206* (2021.01)

(52) U.S. Cl.
CPC ..... *G01D 5/35316* (2013.01); *G01K 11/3206* (2013.01); *A61B 2562/0266* (2013.01)

(58) Field of Classification Search
CPC ............ G01D 5/35316; G01K 11/3206; A61B 2562/0266; A61B 2018/0016;
(Continued)

(56) References Cited

U.S. PATENT DOCUMENTS

| 2013/0066228 A1 | 3/2013 | Capcelea et al. |
| 2016/0096013 A1 | 4/2016 | Tortonese et al. |
| 2017/0196479 A1* | 7/2017 | Liu ...................... A61B 5/6852 |

OTHER PUBLICATIONS

International Search Report and Written Opinion of International Application No. PCT/AU2020/051424, mailed Mar. 17, 2021.

* cited by examiner

*Primary Examiner* — John Bedtelyon
(74) *Attorney, Agent, or Firm* — Heslin Rothenberg Farley & Mesiti P.C.

(57) ABSTRACT

A medical device that includes a carrier member, one or more operative components disposed in the carrier member, an optical fiber at least partly disposed in the carrier member, and at least one fiber Bragg grating (FBG) sensor array associated with the optical fiber and disposed in the carrier member. The carrier member includes an insertion end and side walls that contact the subject's body during positioning of the carrier member in the subject's body. The at least one FBG sensor array measures contact forces at one or both of the insertion end and along the side walls of the carrier member during positioning of the carrier member in the subject's body. A multi-core optical fiber configured for use in a medical device for positioning in a subject's body is also (Continued)

provided. A system and method for guiding positioning of a medical device in a subject's body is also provided.

25 Claims, 10 Drawing Sheets

(58) Field of Classification Search
CPC .......... A61B 2018/00267; A61B 2018/00327; A61B 2018/00577; A61B 2034/2061; A61B 2034/256; A61B 2090/065; A61B 2218/002; A61B 2218/007; A61B 34/20; A61B 2090/062; A61B 2090/374; A61B 2090/376; A61B 2090/378; A61B 2560/0468; A61B 2562/04; A61B 90/06; G01L 1/246; A61N 5/0601; A61N 5/0603; A61N 2005/0605; A61N 2005/0626; A61N 2005/0652; A61N 5/0622; A61N 1/0541; G02B 6/02042; G02B 6/02076; G02B 6/02314; G02B 6/3624; G02B 6/02
See application file for complete search history.

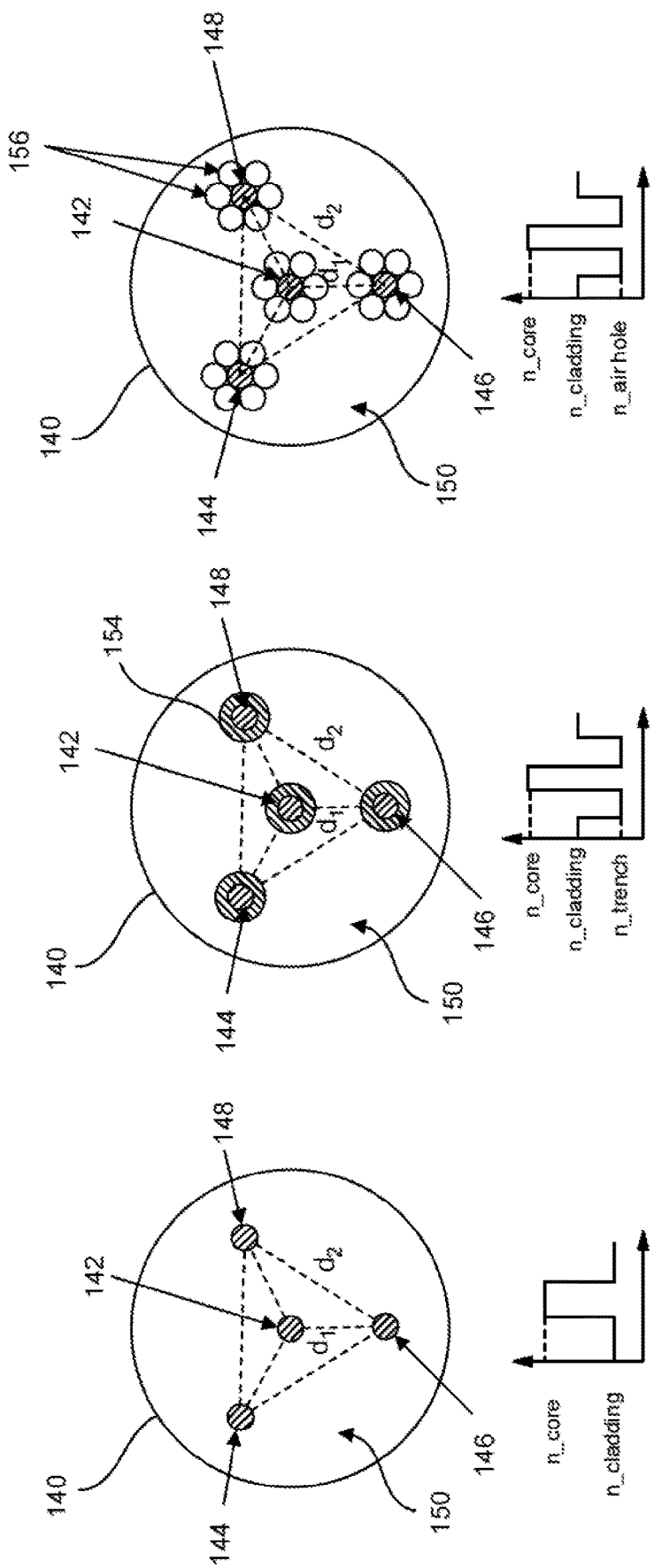

MEDICAL DEVICE AND SYSTEM AND METHOD FOR GUIDING POSITIONING OF SAME

CROSS REFERENCE TO RELATED APPLICATIONS

This application is a National Phase filing under 35 U.S.C. § 371 of International Application No. PCT/AU2020/051424, filed Dec. 23, 2020, and published as WO 2021/127738 A1 on Jul. 1, 2021, which claims the benefit of priority from Australian Patent Application No. 2019904938, filed on 24 Dec. 2019, the entire contents of each of the prior applications are incorporated herein by reference in their entirety.

TECHNICAL FIELD

The present invention relates to a medical device having fiber Bragg grating (FBG) sensors for guiding positioning of the medical device in a human or animal subject's body. It also relates to a system and method for guiding positioning of a medical device in a human or animal subject's body, and an optical fiber configured for use with a medical device.

BACKGROUND OF INVENTION

Medical devices can be temporarily or permanently positioned or implanted in human or animal patients. Depending on the relative dimensions and flexibility of the patient's anatomy and the medical device, the configuration of the insertion or implantation path, and a variety of other factors, injury is sometimes caused due to physical contact between the medical device and patient's anatomy. Physical damage may be caused to surrounding tissues of the patient during positioning or implantation which may adversely affect the patient, surgical procedure or medical device performance.

For example, implantation of an electrode array of a cochlear implant may cause physical trauma or damage to the patient. A cochlear implant is a surgically implanted device which resides inside a cochlea and restores hearing in a patient who suffers from severe hearing deficiencies. It is vital to preserve the residual hearing of the patient so that the cochlear implant operates effectively. A series of complications may arise during the surgical procedure in which the electrode array is inserted into the scala tympani of the cochlea. Any possible physical trauma or damage to the cochlea during implantation must be avoided or at least minimised to maximise the benefit of such a surgical procedure for the patient.

Various attempts have been made to provide guidance and assistance to avoid trauma to the cochlea during insertion of the implant. For instance, introducing an automated insertion tool integrated with force sensing and an image guided positioning system for minimally invasive access to the cochlear, (D. Schurzig et al., "A force sensing Automated Insertion Tool for cochlear electrode implantation," in 2010 IEEE International Conference on Robotics and Automation (IEEE, 2010), pp. 3674-3679), development of a steerable EA and optimum path planning strategies to follow during the insertion of the implant (Zhang, Jian et al., (2008). Path Planning and Workspace Determination for Robot-Assisted Insertion of Steerable Electrode Arrays for Cochlear Implant Surgery. Medical image computing and computer-assisted intervention: MICCAI International Conference on Medical Image Computing and Computer-Assisted Intervention. 11. 692-700), and usage of a robot-assisted steerable electrode prototype to reduce insertion forces and prevent buckling of the electrodes (J. Zhang et al., "Inroads Toward Robot-Assisted Cochlear Implant Surgery Using Steerable Electrode Arrays," Otol. Neurotol. 31(8), 1199-1206 (2010)).

Fiber Bragg grating (FBG) sensors can be an attractive solution for this extremely sensitive surgical procedure. Axial and lateral forces at the electrode array tip, and frictional forces and lateral forces from the proximal section of the array exist during insertion. The experimental configuration of most studies is limited to evaluating only a subset of these forces (Kontorinis, et al., (2011). Impact of the insertion speed of cochlear implant electrodes on the insertion forces. Otology & neurotology, 32(4), 565-570), Rebscher, S. J., et al., (1999). Strategies to improve electrode positioning and safety in cochlear implants. IEEE Transactions on Biomedical Engineering, 46(3), 340-352), which fails to provide detailed information on all these individual force components.

A study has used one FBG sensor in the cochlear implant (Wade S A et al., "Measurement of Forces at the Tip of a Cochlear Implant During Insertion," IEEE Trans. Biomed. Eng., vol 61, no. 4, pp. 1177-1186, April 2014 and Capcelea, E et al., (2013). U.S. patent application Ser. No. 13/231, 957.). This FBG has been inscribed in 125 μm single mode fiber (SMF) where the tip force of the cochlear implant ranged from 75-225 mN which is far above the threshold of approximately 20-25 mN that surgeons can perceive. Furthermore, during insertion of the cochlear implant, the FBG based sensors are expected to navigate through critical bending radii due to the curvature of the cochlear, making the widely used 125 μm SMF unsuitable due to its stiffness which increases the risk of trauma. Moreover, a uniaxial sensor as proposed in the aforementioned studies, limits the information that can be retrieved in a complex 3-D geometry such as the cochlea. This extremely sensitive surgical procedure which involves small dimensions and complex navigation makes insertion of the cochlear implant challenging.

Rogge et al filed a patent describing shape sensing using a multi-core optical fiber (U.S. Pat. No. 8,746,076). The proposed method is employed to calculate the bending curvature and bending direction via the FBGs inscribed in all the cores of the optical fiber. However, the optical fiber is designed in a standard approach, where it exhibits a relatively high stiffness and cannot be bent into small diameters, thus limiting use in a tiny space, such as the cochlear scala tympani.

Taylor et al proposed a sensing system for cochlear implant surgery (U.S. Pat. No. 9,345,397). The sensing device measures from an end of the cochlear implant to the anatomic surface at a distance from the end of the cochlear implant, and the sensor is integrated into an Optical Coherence Tomography (OCT) system so that OCT produces images for quantitative distance measurements. Such a system is considered as an extra-cochlear approach and is not compact for use during surgery. Additionally, no information on the contact force can be provided.

It would be desirable to provide a sensing system that can provide force sensing of the cochlear implant during implantation, and preferably, provide real-time feedback to a surgeon. It may also be desirable to provide a medical device configured to provide force sensing for guiding positioning in a patient's body, and which ameliorate and/or overcome one or more problems or inconveniences of the prior art.

A reference herein to a patent document or any other matter identified as prior art, is not to be taken as an admission that the document or other matter was known or that the information it contains was part of the common general knowledge as at the priority date of any of the claims.

SUMMARY OF INVENTION

In one aspect, the present invention provides a medical device including a carrier member configured for positioning in a subject's body, one or more operative components disposed in the carrier member, an optical fiber at least partly disposed in the carrier member and at least one fiber Bragg grating (FBG) sensor array associated with the optical fiber and being disposed in the carrier member. The carrier member includes an insertion end and side walls that contact the subject's body during positioning of the carrier member in the subject's body. The at least one FBG sensor array is configured for measuring contact forces at one or both of the insertion end and along the side walls of the carrier member during positioning of the carrier member in the subject's body.

In some embodiments, the device further includes a plurality of FBG sensor arrays configured for measuring position of one or both of the insertion end and the side walls of the carrier member during positioning of the carrier member in the subject's body.

In some embodiments, the optical fiber is a multi-core optical fiber having a FBG sensor array disposed in each core for providing contact force and/or position measurements at the location of each FBG. The grating pitch of each FBG in the FBG sensor arrays may be different to enable the reflection wavelengths of the FBGs along each core to be detected individually. The FBG separation in each of the FBG sensor arrays may be substantially identical for providing contact force and/or position measurements at the location of each FBG based on variations in the reflection spectra of the FBG sensor arrays in each core.

In some embodiments, the multi-core optical fiber includes a central core located centrally along the optical fiber and a plurality of cores surrounding the central core that are equally spaced from each other. The multi-core optical fiber may include a low-index region associated with each core. The low-index region may have a lower refractive index than the refractive index of the core and a cladding of the optical fiber for reducing bending loss of optical light during positioning of the carrier member in the subject's body. The low-index region may include a trench surrounding the core, where the trench is air-filled or filled with a fluid having the lower refractive index. Alternatively, the low-index region may include one or more holes surrounding the core, where the holes are air-filled or filled with a fluid having the lower refractive index. In another alternative embodiment, the low-index region may include a plurality of elongate members positioned around and colinearly with the core, where the elongate members include a material have the lower refractive index.

In some embodiments, the multi-core optical fiber includes a plurality of holes arranged in a cladding of the optical fiber to induce bending in a desired direction during positioning of the carrier member in the subject's body. The multi-core optical fiber may also include a cladding that is shaped to induce bending in a desired direction during positioning of the carrier member in the subject's body. For example, a cross-section of the cladding may include one or more of the following shapes: circular, rectangular, square, triangular, oval and elliptical.

The one or more operative components may include at least one electrode array or optical array, and the FBG sensor array may be aligned relative to the at least one electrode array or optical array in the carrier member.

In some embodiments, the device is an implantable medical device and the carrier member is configured for implantation in the subject's body. The device may be a cochlear implant device and the one or more operative components may include at least one electrode array or optical array for providing stimulation to the nervous system of the subject.

In another aspect of the present invention, there is provided a multi-core optical fiber configured for use in a medical device for positioning in a subject's body. The multi-core optical fiber includes a fiber Bragg grating (FBG) sensor array disposed in each core configured for providing one or both of contact force and position measurements at the location of each FBG during positioning of the medical device in the subject's body.

In some embodiments, the grating pitch of each FBG in the FBG sensor arrays is different to enable the reflection wavelengths of the FBGs along each core to be detected individually. The FBG separation in each of the FBG sensor arrays may also be substantially identical for providing contact force and/or position measurements at the location of each FBG based on variations in the reflection spectra of the FBG sensor arrays in each core.

In some embodiments, the multi-core optical fiber includes a central core located centrally along the optical fiber and a plurality of cores surrounding the central core that are equally spaced from each other. The multi-core optical fiber may include a low-index region associated with each core. The low-index region may have a lower refractive index than the refractive index of the core and a cladding of the optical fiber for reducing bending loss of optical light during positioning of the medical device in the subject's body. The low-index region may include a trench surrounding the core, where the trench is air-filled or filled with a fluid having the lower refractive index. Alternatively, the low-index region may include one or more holes surrounding the core, where the holes are air-filled or filled with a fluid having the lower refractive index. In another alternative embodiment, the low-index region may include a plurality of elongate members positioned around and colinearly with the core, where the elongate members include a material have the lower refractive index.

In some embodiments, the multi-core optical fiber further includes a cladding having a plurality of holes arranged therein to induce bending of the optical fiber in a desired direction during positioning of the medical device in the subject's body. The multi-core optical fiber may further include a cladding that is shaped to induce bending in a desired direction during positioning of the medical device in the subject's body. For example, a cross-section of the cladding may include one or more of the following shapes: circular, rectangular, square, triangular, oval and elliptical.

In some embodiments, the device is an implantable medical device configured for implantation in the subject's body. The device may be a cochlear implant device.

In another aspect, the present invention provides a system for guiding positioning of a medical device in a subject's body. The system includes a medical device including: a carrier member configured for positioning in the subject's body, the carrier member including an insertion end and side walls that contact the subject's body during positioning of the carrier member in the subject's body; one or more operative components disposed in the carrier member; an optical fiber at least partly disposed in the carrier member; and at least one fiber Bragg grating (FBG) sensor array associated with the optical fiber and being disposed in the carrier member. The system also includes an interrogator coupled to the optical fiber and configured to obtain reflection spectra data from the FBG sensor array during positioning of the carrier member in the subject's body. The system also includes a processor configured to receive the reflection spectra data from the interrogator and to process the reflection spectra data to determine contact forces at one or both of the insertion end and along the side walls of the carrier member during positioning of the carrier member in the subject's body.

In some embodiments, the device further includes a plurality of FBG sensor arrays, and the processor is further configured to process the reflection spectra data to determine position of one or both of the insertion end and the side walls of the carrier member during positioning of the carrier member in the subject's body.

Preferably, the optical fiber is a multi-core optical fiber including a fiber Bragg grating (FBG) sensor array disposed in each core, and the system further includes a coupling device for coupling each core to the interrogator for separately detecting the reflection spectra of the FBG sensor arrays in each core.

In some embodiments, the processor is further configured to receive position data of a target region of the subject's body prior to positioning of the carrier member in the subject's body, and process data corresponding to the position of the carrier member relative to the position data of the target region to determine a depth of positioning of the carrier member in the subject's body. The processor may be further configured to receive an image of the target region of the subject's body prior to positioning of the carrier member in the subject's body, reconstruct an image of the carrier member using the data corresponding to the position of the carrier member, overlay the reconstructed image of the carrier member on the image of the target region of the subject's body, and output data representing an image of the position of the carrier member relative to the target region of the subject's body.

Optionally, the system may further include a display device. The processor may be further configured to display on the display device one or both of: an infographic of the contact forces on the carrier member relative to the depth of positioning of the carrier member, and an image of the position of the carrier member relative to the target region of the subject's body.

Ideally, the processor is further configured to process the data in real-time to provide contact force and/or position information of the carrier member during positioning of the carrier member in the subject's body.

The processor may be further configured to detect when the contact forces on the carrier member exceed a threshold value over which damage to internal tissues of the subject's body is likely to occur. When the threshold value is exceeded, the processor may be configured to output a notification signal of excessive contact forces on the internal tissues of the subject's body. When the threshold value is exceeded, the processor may be further configured to output data representing instructions to perform one or more of the following: stop advancing the carrier member into the subject's body, at least partially withdraw the carrier member from the subject's body, adjust an insertion angle of the carrier member relative to the subject's body, and re-insert the carrier member into the subject's body.

In some embodiments, the device is an implantable medical device and the carrier member is configured for implantation in the subject's body. The medical device may be a cochlear implant device and the one or more operative components may include at least one electrode array or optical array for providing stimulation to the nervous system of the subject. The processor may be further configured to one or both of: process the data to detect when the contact forces on the carrier member are indicative of fold-over of a tip of the at least one electrode array or optical array, and output a notification signal of fold-over of the tip.

In another aspect of the present invention, there is provided a method for guiding positioning of a medical device in a subject's body. The method includes the step of providing a medical device including: a carrier member configured for positioning in the subject's body, the carrier member including an insertion end and side walls that contact the subject's body during positioning of the carrier member in the subject's body; one or more operative components disposed in the carrier member; an optical fiber at least partly disposed in the carrier member; and at least one fiber Bragg grating (FBG) sensor array associated with the optical fiber and being disposed in the carrier member. The method also includes the step of positioning the insertion end of the carrier member in the subject's body. The method also includes the step of using an interrogator coupled to the optical fiber to obtain reflection spectra data from the FBG sensor array during positioning of the carrier member in the subject's body. The method also includes the step of determining contact forces at one or both of the insertion end and along the side walls of the carrier member during positioning of the carrier member in the subject's body based on the reflection spectra data from the interrogator.

In some embodiments, the device further includes a plurality of FBG sensor arrays, and the method further includes the step of determining position of one or both of the insertion end and the side walls of the carrier member during positioning of the carrier member into the subject's body based on the reflection spectra data from the interrogator.

Preferably, the optical fiber is a multi-core optical fiber including a fiber Bragg grating (FBG) sensor array disposed in each core, and the method further includes the step of coupling each core to the interrogator by a coupling device for separately detecting the reflection spectra of the FBG sensory arrays in each core.

In some embodiments, the method further include the following steps: receiving, using a processor, position data of a target region of the subject's body prior to positioning of the carrier member in the subject's body; and processing, using the processor, data corresponding to the position of the carrier member relative to the position data of the target region to determine a depth of positioning of the carrier member in the subject's body. The method may also include the following steps: receiving, using the processor, an image of the target region of the subject's body prior to positioning the carrier member in the subject's body; reconstructing, using the processor, an image of the carrier member using the data corresponding to the position of the carrier member; overlaying, using the processor, the reconstructed image of the carrier member on the image of the target region of the subject's body; and outputting, using the processor, data representing an image of the position of the carrier member relative to the target region of the subject's body.

Optionally, the method further includes the step of displaying, using the processor, on a display device one or both of: an infographic chart of the contact forces on the carrier member relative to the depth of positioning in the subject's body; and an image of the position of the carrier member relative to the target region of the subject's body.

Preferably, the method further includes determining in real-time contact force and/or position information of the carrier member during positioning of the carrier member in the subject's body.

In some embodiments, the method further includes the step of determining when the contact forces on the carrier member exceed a threshold value over which damage to internal tissues of the subject's body is likely to occur. When the threshold value is exceeded, the method may further include the step of outputting, using a processor, a notification signal of excessive contact forces on the internal tissues of the subject's body. When the threshold value is exceeded, the method may further include one or more of the following steps: stopping advancing of the carrier member in the subject's body; at least partially withdrawing the carrier member from the subject's body; adjusting an insertion angle of the carrier member relative to the subject's body; and re-inserting the carrier member into the subject's body.

In some embodiments, the device is an implantable medical device and the carrier member is configured for implantation in the subject's body. The medical device may be a cochlear implant device and the one or more operative components include at least one electrode array or optical array for providing stimulation to the nervous system of the subject. The method may further include the steps of determining when the contact forces on the carrier member are indicative of fold-over of a tip of the at least one electrode array or optical array; and outputting, using a processor, a notification signal of fold-over of the tip.

In another aspect, the present invention provides an implantable medical device including: a carrier member configured for implantation into a subject, the carrier member including an insertion end and side walls that contact the subject during implantation; one or more operative components disposed in the carrier member; an optical fiber at least partly disposed in the carrier member; and at least one fiber Bragg grating (FBG) sensor array associated with the optical fiber and being disposed in the carrier member, wherein the at least one FBG sensor array is configured for measuring contact forces at one or both of the insertion end and along the side walls of the carrier member during implantation into the subject.

In another aspect of the present invention, there is provided a multi-core optical fiber configured for use in an implantable medical device, the multi-core optical fiber including a fiber Bragg grating (FBG) sensor array disposed in each core configured for providing one or both of contact force and position measurements at the location of each FBG during implantation of the medical device in a subject.

In another aspect of the present invention, there is provided a system for guiding implantation of a medical device into a subject, the system including: an implantable medical device including: a carrier member configured for implantation into the subject, the carrier member including an insertion end and side walls that contact the subject during implantation; one or more operative components disposed in the carrier member; an optical fiber at least partly disposed in the carrier member; and at least one fiber Bragg grating (FBG) sensor array associated with the optical fiber and being disposed in the carrier member; an interrogator coupled to the optical fiber and configured to obtain reflection spectra data from the FBG sensor array during implantation of the carrier member into the subject; and a processor configured to receive the reflection spectra data from the interrogator and to process the reflection spectra data to determine contact forces at one or both of the insertion end and along the side walls of the carrier member during implantation into the subject.

In another aspect of the present invention, there is provided a method for guiding implantation of a medical device into a subject, the method including the steps of: providing an implantable medical device including: a carrier member configured for implantation into the subject, the carrier member including an insertion end and side walls that contact the subject during implantation; one or more operative components disposed in the carrier member; an optical fiber at least partly disposed in the carrier member; and at least one fiber Bragg grating (FBG) sensor array associated with the optical fiber and being disposed in the carrier member; advancing the insertion end of the carrier member into an implantation region of the subject; using an interrogator coupled to the optical fiber to obtain reflection spectra data from the FBG sensor array during implantation of the carrier member into the subject; and determining contact forces at one or both of the insertion end and along the side walls of the carrier member during implantation based on the reflection spectra data from the interrogator.

BRIEF DESCRIPTION OF DRAWINGS

The invention will now be described in greater detail with reference to the accompanying drawings in which like features are represented by like numerals. It is to be understood that the embodiments shown are examples only and are not to be taken as limiting the scope of the invention as defined in the claims appended hereto.

FIGS. 5A-C are schematic illustrations showing cross-sections and corresponding index profiles of a multi-core optical fiber according to some embodiments of the invention with traditional step-index profiles (FIG. 5A), low-index trenches around the core (FIG. 5B), and air holes around the core (FIG. 5C).

DETAILED DESCRIPTION

Embodiments of the invention are discussed herein by reference to the drawings which are not to scale and are intended merely to assist with explanation of the invention. Reference herein to a subject may refer to a human or an animal subject or patient. Reference herein to the terms "distal" and "proximal" are to be interpreted relative to a surgeon or operator implanting the medical device. Distal refers to a feature being directed away from the surgeon or operator and proximal refers to a feature being directed towards the surgeon or operator.

Embodiments of the invention are generally directed to providing force and/or position sensing for guiding positioning or implantation of a medical device into a subject. As noted, many types of medical devices are temporarily or permanently positioned or implanted into a subject's body. The following detailed description is provided with reference to one type of implantable medical device, namely, a cochlear implant. It will be appreciated, however, that aspects and embodiments of the invention will also have application to other types of medical devices that may cause physical trauma or damage during or subsequent to positioning or implantation in a subject's body. For example, embodiments of the invention may have application to other medical devices which require positioning or implantation, temporarily or permanently, into narrow and/or delicate sections of the patient's anatomy and/or which require complex navigation by a surgeon.

Figure 1:
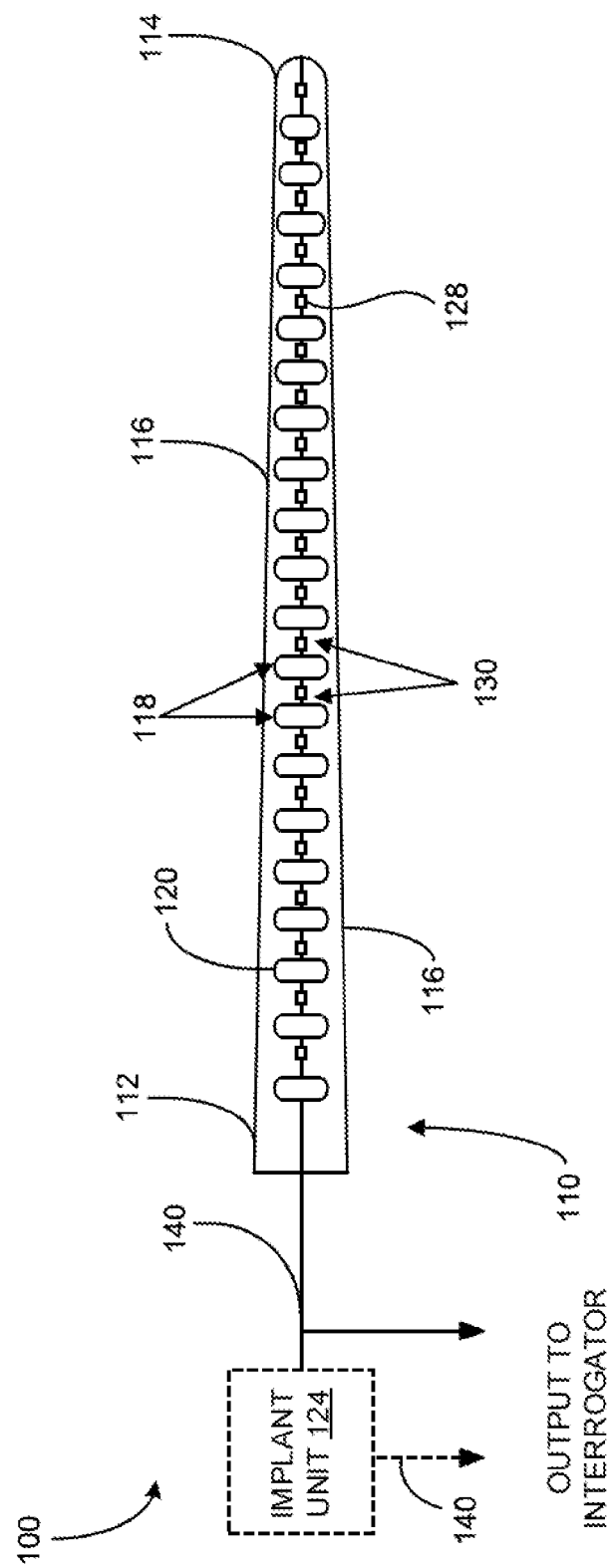
FIG. 1 is a schematic illustration showing components of a medical device according to some embodiments of the invention.

FIG. 1 is a simplified schematic diagram showing components of a medical device 100 according to some embodiments of the invention. The medical device 100 includes a carrier member 110 configured for positioning in a subject's body 400 (see also FIG. 2). The carrier member 110 includes an insertion end 114 and side walls 116 that contact the subject's body 400 during positioning of the carrier member 110 in the subject's body 400. The medical device 100 also includes one or more operative components 118 disposed in the carrier member 110 and an optical fiber 140 at least partly disposed in the carrier member 110. The medical device 100 also includes at least one fiber Bragg grating (FBG) sensor array 130 associated with the optical fiber 140 and is disposed in the carrier member 110. The at least one FBG sensor array 130 is configured for measuring contact forces at one or both of the insertion end 114 and along the side walls 116 of the carrier member 110 during positioning of the carrier member 110 in the subject's body 400.

The device 100 may be an implantable medical device and the carrier member 110 may be configured for implantation in the subject's body 400.

The carrier member 110 may, in use, be coupled with an implant unit 124 through a coupling such as induction coils (not shown). The implant unit 124 may include a sound processor and other components for a cochlear implant. Alternatively, the medical implant 100 may be completely implanted in the subject's body 400 and include the implant unit 124.

The carrier member 110 may be made of a medical grade material, preferably silicone, which is suitable for positioning or implantation temporarily or permanently into the subject's body 400. The carrier member 110 includes an insertion end or distal tip 114, side walls 116 along a length of the carrier member 110 and a proximal end 112 as shown in FIG. 1. One or more operative components 118 disposed in the carrier member 110 may include an electrode array 118 and stimulation circuitry for stimulating the nervous system of the subject (not shown). The one or more operative components or electrode array 118 may be embedded in the carrier member 110. The carrier member 110 also includes at least one FBG sensor array 130 disposed therein. Optionally, the FBG sensor array 130 may be embedded in the carrier member 110. The FBG sensor array 130 and electrode array 118 may be located along the entire length of the carrier member 110 from the distal tip 114 to the proximal end 112 as shown in FIG. 1. However, in other embodiments, the FBG sensor array 130 and/or electrode array 118 may only be positioned within part of the carrier member 110. Preferably, the FBG sensor array 130 and/or electrode array 118 are at least positioned or located near the distal tip 114 of the carrier member 110.

Additionally/alternatively, the one or more operative components 118 may include an optical array and stimulation circuitry for optically stimulating the nervous system of the subject. In some embodiments, the optical array may include one or more of the features described with respect to the electrode array 118, namely the structure and alignment of the array in the carrier member 110 and relative to the FBG sensor array 130.

As illustrated in FIG. 1, the electrode array 118 may include a number of electrodes 120 and electrical wires associated with each electrode 120 (which have been omitted for clarity). Typically, cochlear implant devices 100 may include about 20 electrodes spaced approximately 400 μm apart along a length of the implant 110 and the total effective implant length may be approximately 20 mm. It would be ideal to include more electrodes 120 and a longer insertion length of the cochlear implant 100 for implantation inside the scala tympani (ST) channel 440 of the cochlear 430 to stimulate a wider range of frequencies (see also FIG. 2). However, insertion of the cochlear implant 100 deep into the ST channel 440 is challenging due to its tiny size and spiral structure. A cochlear implant 100 without any force feedback during implantation could result in trauma to the neural membrane of the cochlea 430.

The electrode array 118 is preferably in a linear array as shown in FIG. 1. However, other suitably dimensioned and structured electrode arrays may be used, which optionally, may also be suitable for arrangement with the FBG sensor array 130. Carrier member 110, electrodes 120 and implant unit 124, apart from the differences explained herein, are provided in existing cochlear implants and will therefore not be described in further detail.

An optical fiber 140 extends from the insertion end 114 to the proximal end 112 of the carrier member 110 as shown in FIG. 1. However, in other embodiments the optical fiber 140 may only be partly disposed in the carrier member 110. The at least one FBG sensor array 130 is associated with the optical fiber 140. The FBG sensor array 130 may be disposed in the optical fiber 140 as shown in FIG. 1. Preferably, the FBG sensor array 130 is embedded in the optical fiber 140. In some embodiments, the FBG sensor array 130 may be inscribed or written into the optical fiber 140 during manufacture, as will be described in further detail.

The optical fiber 140 extends beyond the carrier member 110, exiting at the proximal end 112 as illustrated in FIG. 1. The optical fiber 140 may be coupled to an interrogator 210 through a coupling device 230 (see also FIG. 7). In some embodiments, the optical fiber 140 is terminated in an implant unit 124 or extends through the implant unit 124 as shown in the broken lines in FIG. 1. When the optical fiber 140 is terminated in implant unit 124, an interrogator 210 is coupled (e.g., optically connected by a suitable optical fiber) with a port of the implant unit 124 (not shown). When optical fiber 140 extends through implant unit 124, the optical fiber 140 is suitably connected to the interrogator 210 (see also FIG. 7).

In some embodiments, the FBG sensor array 130 and electrode array 118 are co-located in the carrier member 110. Preferably, the FBG sensor array 130 is aligned relative to the electrode array 118 in the carrier member 110 as shown in FIG. 1. The FBG sensor array 130 includes a number of fiber Bragg gratings (FBGs) 128 along a length of the array 130 (see also FIG. 3). The FBG sensor array 130 is preferably in a linear array as shown in FIG. 1. However, other suitably dimensioned and structured arrays may be used, which optionally, may also be suitable for arrangement with the electrode array 118.

Figure 2:
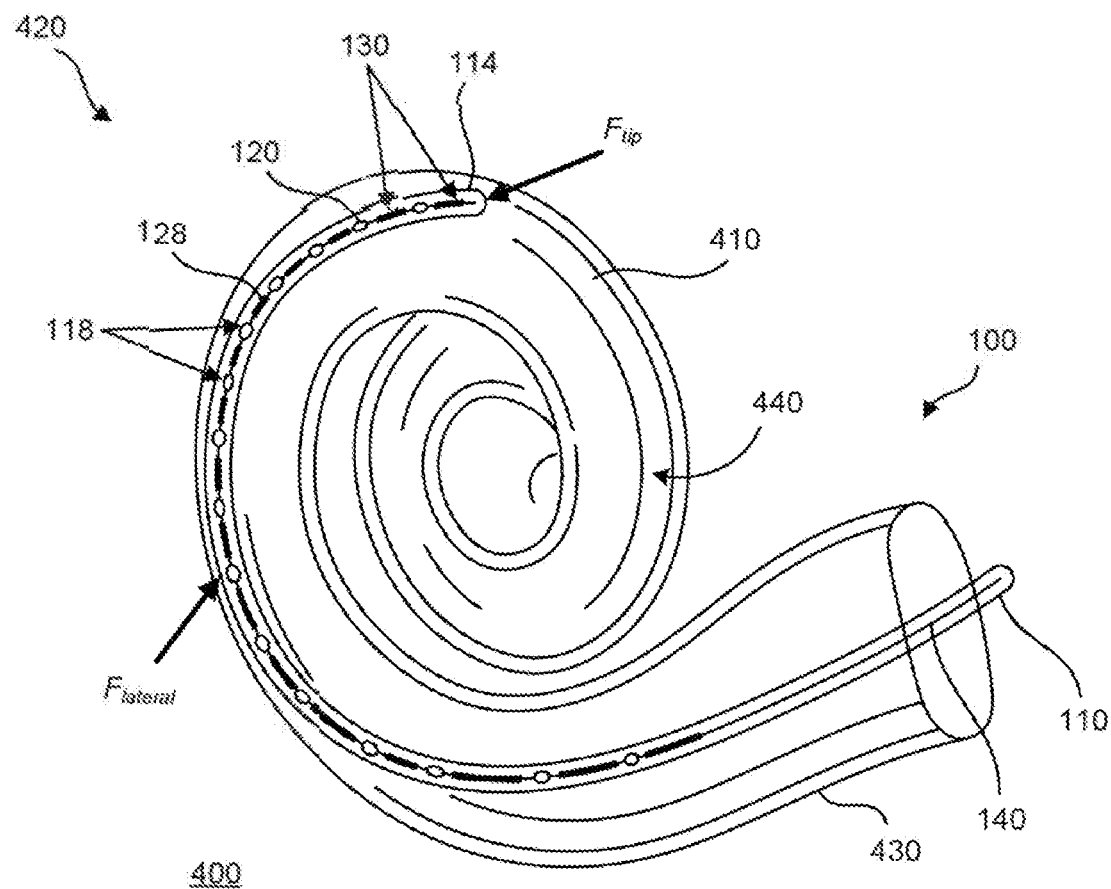
FIG. 2 is a schematic illustration showing the device of FIG. 1 inserted into a scala tympani channel of a cochlea of a subject according to some embodiments of the invention.

The FBG sensor array 130 may be arranged in such a way that each FBG 128 lies in between two electrodes 120 as shown in FIGS. 1 and 2. For electrode arrays 118 in cochlear implants 110, the typical length of one electrode 120 is approximately 400 µm and its separation is approximately 400 µm. The FBG sensor array 130 can be designed with the same length and spacing as the electrode array 118 as shown in FIG. 1. However, the FBG sensor array 130 can also be fabricated in other configurations in which one FBG 128 could cross over an electrode 120. In this example, the FBG sensors 128 will provide less spatial resolution for contact force and/or position measurements. For cochlear implant applications, the recommended length of one FBG 128 is in the range of approximately 0.4 mm to 3 mm, and the separation between two FBGs 128 is also in the range of approximately 0.4 mm to 3 mm. The length of the FBG grating array 130 may be in the range of approximately 10 mm to 40 mm, depending on the length of the electrode array 118. It should be noted that longer FBG length may lead to a chirped effect on the FBG signal, which is undesirable during detection.

In some embodiments, the carrier member 110 is integrally formed. Alternatively, in other embodiments, carrier member 110 is formed in parts, joined together through welding, adhesive, over-molding or other techniques. Ideally, the electrode array 118 is embedded in the carrier member 110. The fabrication process may follow a standard fabrication process for conventional cochlear implants, apart from the FBG sensor array 130 which may also be embedded in the carrier member 110 of a cochlear implant 100 along a length of the carrier member 110.

FIG. 2 depicts a schematic illustration of the medical device 100 of FIG. 1 inserted into a scala tympani channel 440 of a cochlea 430 of a subject according to some embodiments of the invention. As shown, the cochlear implant 100 includes an arrangement of the electrode array 118 and FBG sensor array 130 having alternating electrodes 120 and FBGs 128 positioned from the insertion end or tip 114 and along the carrier member 110 to the proximal end 112. The electrode array 118 functions to stimulate acoustic frequencies of the nervous system of the subject 400. The FBG array 130 is configured for measuring contact forces at one or both of the insertion end or tip 114 and along the side walls 116 of the carrier member 110 during positioning or implantation of the carrier member 110 into the subject's body 400. Ideally, the medical device 100 includes a plurality of FBG sensor arrays 130 configured for measuring position of one or both of the insertion end 114 and the side walls 116 of the carrier member 110 during positioning or implantation of the carrier member 110 into the subject's body 400 (see also FIG. 3). The contact force and/or position measurements may be provided at a number of locations along the implant 100 to provide information about the location or orientation of the implant 100, and in some embodiments, to reconstruct the shape of the cochlear implant 100 inside the ST channel 440 (see also FIG. 12).

Figure 3:
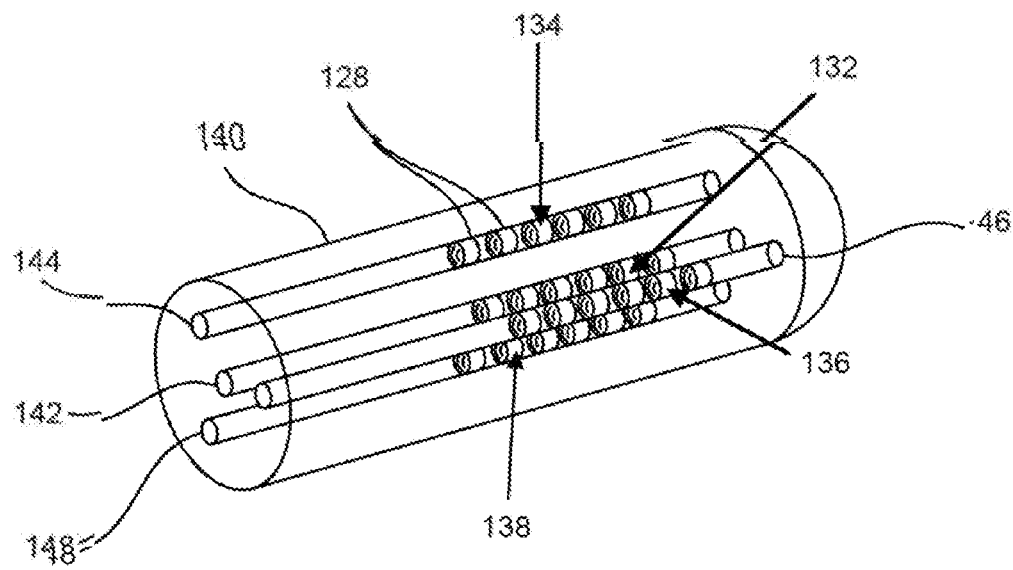
FIG. 3 is a perspective view of a multi-core optical fiber showing a FBG in each core at a distal tip according to some embodiments of the invention.

FIG. 3 is a perspective view of a multi-core optical fiber 140 showing a FBG 128 in each core at a distal tip 114 thereof according to some embodiments of the invention. The optical fiber 140 includes a central core 142 located centrally along the optical fiber 140 and a plurality of cores 144, 146 and 148 surrounding the central core 142 that are equally spaced from each other (see also cross-sections of FIGS. 5A-C). In other embodiments, the multi-core optical fiber 140 may include at least one core parallel to the central core 142, or alternatively, more than three cores surrounding the central core 142. Additionally/alternatively, the surrounding cores 144, 146 and 148 may not be equally spaced from each other but may have an unequal radial spacing relative to the central core 142.

The multi-core optical fiber 140 illustrated in FIG. 3 includes a FBG sensor array 132, 134, 136 and 138 disposed in each core 142, 144, 146 and 148, respectively, for providing force and/or position measurements at the location of each FBG 128. Reference throughout the figures to $FBG_{n,i}$ (i=1, . . . , K; n=1, 2, 3 . . . , M) denotes the FBG sensor arrays 130 inscribed in the K cores (i=1, . . . , K), and each core 142, 144, 146 and 148 has M FBG sensors 128. The multi-core optical fiber 140 is preferably placed on a cylindrical axis of the carrier member 110 as shown in FIG. 1.

In some embodiments, the grating pitch of each FBG 128 in the FBG sensor arrays 132, 134, 136 and 138 is different to enable the reflection wavelengths of the FBGs 128 along each core 142, 144, 146 and 148 to be detected individually. This ensures that the Bragg wavelengths of FBGs 128 along the same core 142, 144, 146 and 148 are different and can be detected individually. The grating pitch or reflection wavelength can increase or decrease consecutively along the FBG sensor arrays 132, 134, 136 and 138.

Figure 4:
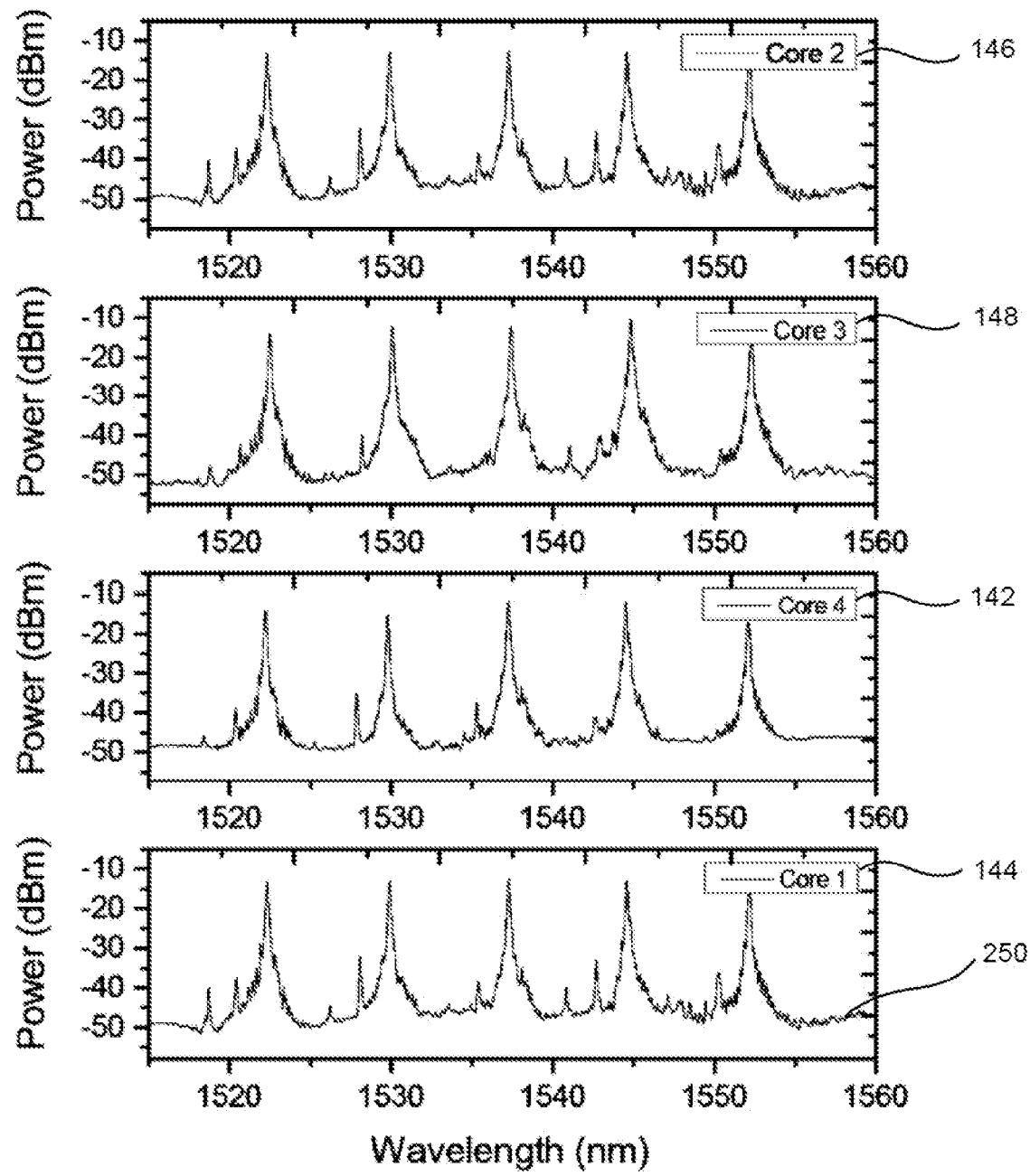
FIG. 4 is a series of charts showing reflection spectra of a five-FBG array inscribed in a four-core multi-core optical fiber according to some embodiments of the invention.

In some embodiments, the FBG separation in each of the FBG sensor arrays 132, 134, 136 and 138 is substantially identical for providing contact force and/or position measurements at the location of each FBG 128 based on variations in the reflection spectra 250 of the FBG sensor arrays 130 in each core 142, 144, 146 and 148 (see also FIG. 4). The FBG sensor arrays 132, 134, 136 and 138 in the different cores may be substantially identical in one or more of the following: number of FBGs 128, FBG length, FBG separation and reflection wavelength. Alternatively, the FBG sensor arrays 132, 134, 136 and 138 in the different cores may be substantially identical in one or more of the following: number of FBGs, FBG length and FBG separation, and have different reflection wavelengths. The reflection wavelength of FBGs 128 at different positions may increase or decrease following the sequence of the grating array 130.

To fabricate the FBG sensor array 130 (e.g., arrays 132, 134, 136 and 138), the FBGs 128 at a certain position can be fabricated using phase mask technique by scanning a UV laser beam (e.g. with wavelengths of 193 nm, 213 nm, 248 nm, 266 nm, 325 nm) and the grating is created in the multi-core optical fiber 140 due to the photosensitivity. Alternatively, the FBGs 128 can also be fabricated using other approaches, namely, using Talbot interferometer where two laser beams interfere constructively or destructively at the fiber position to create grating patterns, and using point-by-point micromachining based on femtosecond laser. Generally, the FBGs 128 in all of the multiple cores 142, 144, 146 and 148 can be inscribed simultaneously at the certain position. After completing the inscription, either the optical fiber 140 or the phase mask or femtosecond laser beam moves to the next position to fabricate the next grating. When the FBGs 128 are created at the certain position, multiple FBGs 128 are inscribed simultaneously in all of the cores 142, 144, 146 and 148, and these FBGs 128 typically have the same pitch. However, a slight difference in Bragg wavelength may occur for the FBGs 128 in different cores 142, 144, 146 and 148 due to differences in core index. Typically, all of the gratings are apodised to suppress the side lobes in the reflection spectrum 250, making the detection of the Bragg wavelength more precise. However, uniform gratings are also applicable as long as the main reflective peak dominates in the spectrum. Peak detection is generally precise when the side lobe suppression (SLS) is over 15 dB.

FIG. 4 is a series of charts showing reflection spectra 250 of a five-FBG sensor array 130 inscribed in a four-core multi-core optical fiber 140 according to some embodiments of the invention. The FBG sensor arrays 132, 134, 136 and 138 in each of the four cores 142, 144, 146 and 148 includes five FBGs 128. The FBGs 128 at the same position or location along the optical fiber 140 have similar grating pitch, resulting in the same Bragg wavelength. However, FBGs 128 at different positions or locations along the optical fiber 140 have different pitches, either decreasing or increasing with the FBG sequence. This leads to different Bragg wavelengths for all of the FBGs 128 written, inscribed or embedded in the same core, making the Bragg peaks from one core detectable in the reflection spectrum 250. Preferably, each core 142, 144, 146 and 148 of the multi-core optical fiber 140 is connected to a separate channel of an interrogator 210 so that the grating signal from all of the cores do not cross and are separately detectable (see also FIG. 7).

As previously discussed, the multi-core optical fiber 140 can include a central core 142 located centrally along the optical fiber 140 and include one or more cores surrounding the central core 142. The surrounding cores can be arranged in various formations in the cladding 150 relative to the central core 142. FIGS. 5A-C show some embodiments of a four-core optical fiber 140 where one core 142 is located in the centre of the optical fiber 140 and the other three cores 144, 146 and 148 are arranged in a triangular formation relative to the central core 142. The three cores 144, 146 and 148 may be located at the apexes of an equilateral triangle as shown in FIGS. 5A-C. The distance between the central core 142 and each outer-core 144, 146 and 148 is $d_1$, and the distance between two of the outer cores 144, 146 and 148 is $d_2$, where $d_2 = 2d_1 \cos 30°$. Typically, $d_1$ can be one quarter of the diameter of the optical fiber 140. In other embodiments, the surrounding cores may be arranged in e.g., hexagonal, square, circular or other formations, relative to the central core 142.

Ideally, the multi-core optical fiber 140 is a low-bending loss optical fiber 140. The refraction index of the core is slightly higher than the refraction index of the cladding 150 ensuring light guidance along the optical fiber 140. When inscribing the FBGs 128 in this optical fiber 140, four gratings can be manufactured simultaneously at the same cross-sectional plane, as shown in FIG. 5A. Typically, each grating has the same pitch, resulting in the same Bragg wavelength. However, the difference in the refractive index of each core may cause different Bragg wavelengths, which does not affect the interrogation of the grating.

The index profile of the core (n_core) and cladding (n_cladding) can be standard step-index, as shown in FIG. 5A as long as the index contrast can confine the light well especially in small bending diameters, e.g., <3 mm for use with medical devices 100, and preferably cochlear implants. FIGS. 5B-C show alternative designs of the core-cladding index profile where there is a low-index region associated with each core 142, 144, 146 and 148. The low-index region has a lower refractive index than the refractive index of each core 142, 144, 146 and 148 and a cladding 150 of the optical fiber 140 for reducing bending loss of optical light, particularly during positioning or implantation of the optical fiber 140 of a medical device 100 in a subject's body 400.

FIG. 5B shows a design having a low-index region in the form of a trench 154 (n_trench) around each of the cores 142, 144, 146 and 148, meaning that the index of the trench 154 is lower than both core and cladding indices. The trench 154 may be air-filled or filled with a fluid having a lower refractive index than those of the core and cladding. The trench 154 may be a channel that surrounds each core 142, 144, 146 and 148 and extends longitudinally along the entire length of the optical fiber 140. Alternatively, the trench 154 may only extend along each FBG 128 of the FBG sensor array 130 such that there may be a plurality of short trenches positioned along the optical fiber 140 at the location of each FBG 128.

FIG. 5C shows another embodiment in which the low-index region is the form of one or more holes 156 surrounding each core 142, 144, 146 and 148. The holes are air-filled in this embodiment and arranged in a ring structure having six air holes 156 for each core 142, 144, 146 and 148. The average index of the air holes ($n_{avg\_air hole}$) is also lower than those of the core and cladding. In other embodiments, the holes may be filled with a fluid having a lower refractive index than those of the core and cladding 150. Furthermore, the holes 156 may be arranged in different structures or shapes in the optical fiber 140. Additionally/alternatively, the low-index region may include a single hole 156 or two or more holes 156 and not be limited to the six air holes 156 as shown in FIG. 5C. The holes or ring structure 156 may be located at each FBG 128 along the FBG sensor array 130 and the ring structure or similar shape may be located in a cross-sectional plane of the optical fiber 140 as shown in FIG. 5C. Alternatively, in some embodiments the one or more holes 156 may extend longitudinally either partly or entirely along the optical fiber 140 surrounding each core 142, 144, 146 and 148. In some embodiments, the one or more holes 156 form elongate channels along the optical fiber 140 that extend partly or entirely through the cladding 150.

In another embodiment, the low-index region includes a plurality of elongate members positioned around and colinearly with each core 142, 144, 146 and 148 (not shown). The elongate members include a material having a lower refractive index than the core and cladding. The elongate members may be shaped as rods positioned in the cladding 150 around each core 142, 144, 146 and 148. The rods may extend longitudinally partly or entirely through the cladding 150. Since the index of air is 1, lower than silica glass (1.444 at 1550 nm), each air hole 156 of the embodiment of FIG. 5C can also be replaced by a low-index rod that has a lower index than silica glass (not shown). Among all these designs, the low-index trenches 154 or air-hole rings 156 or low-index rods are introduced to reduce the bending loss, particularly for the extremely small bending diameter (e.g. <3 mm), which is applicable for the limited space in implantation into the scala tympani (ST) channel 440 of the cochlea 430.

To fabricate the low-bending loss multi-core optical fiber 140, the core canes can be firstly drawn from a preform manufactured using a modified chemical vapor deposition (MCVD) technique. The silica core cane is doped with germanium to increase its refractive index and enable its photosensitivity for inscribing FBGs. Then, four core canes are chosen to create a stack in a jacketing tube and the arrangement of the four core canes follows the aforementioned designs (e.g., those of FIGS. 5B-C and the low-index elongate members or rods). All the gaps during the stacking can be filled with different sizes of pure silica rods.

As for the design with low-index trench 154, the trench 154 can be introduced during the MCVD process. For the design with air holes 156 or low-index rods, the air holes 156 and low-index rods can be introduced during the stacking process. Instead of stacking the cores in a jacket tube, the preform can be made based on a pure silica rod with a large diameter and four inner holes pre-drilled in the shape same as the core arrangement. This kind of silica rod with inner holes is called a multi-bore rod. Then, the core canes can be directly inserted into the inner holes of the multi-bore rod. The diameter of the core canes is slightly smaller than the inner diameter of the holes.

As an embodiment of the design in FIG. 5C, there are three feasible approaches to fabricate the fiber. 1) Using the stack-and-draw technique: firstly, a jacket tube with inner/outer diameter of e.g., 19 mm, 25 mm is fully filled with silica rods in a diameter of 2 mm, and all these rods are arranged in a hexagonal structure. Then, the four core canes are inserted in a certain position and replace four silica rods, depending on the design shown in FIG. 5C. Then around each core cane, another six capillaries with a diameter of 2 mm are used to replace six silica rods. The final assembly is drawn to fiber with desirable diameter at a temperature of ~1950° C. 2) Using the stack-and-draw technique: firstly, stack an intermediate preform in a tube with inner/outer diameter of e.g., 6 mm, 12 mm. In this intermediate preform, one core rod in 1 mm diameter and six capillaries in 1 mm diameter are stacked together in a hexagonal structure. Then the intermediate preform is drawn to a core cane with a diameter of 6 mm. One core cane has a similar structure of one core as shown in FIG. 5C. To form the second preform, four core canes are inserted in another jacket tube with inner/outer diameter of e.g., 19 mm, 25 mm, during which all the gaps can be filled with purse silica rods having various sizes. The final assembly is drawn to fiber with a desirable diameter at a temperature of ~1950° C. 3) Using cane-in-tube approach: firstly, draw the core cane as the same as the former approach. Then, insert the four core canes in a multi-bore rod which has four holes with diameter of ~6 mm. In this approach, there is no gap between the core canes as the previous one. The final assembly is drawn to fiber with desirable diameter at a temperature of ~1950° C.

Figure 6A:
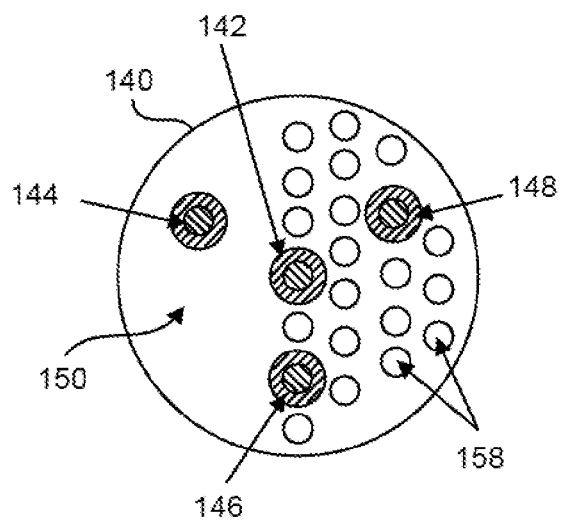
FIGS. 6A-B are schematic illustrations showing cross-sections of a multi-core optical fiber according to some embodiments of the invention with air holes in one half of the cladding, showing a circular cross-section of the cladding (FIG. 6A) and a rectangular cross-section of the cladding (FIG. 6B).
Figure 6B:
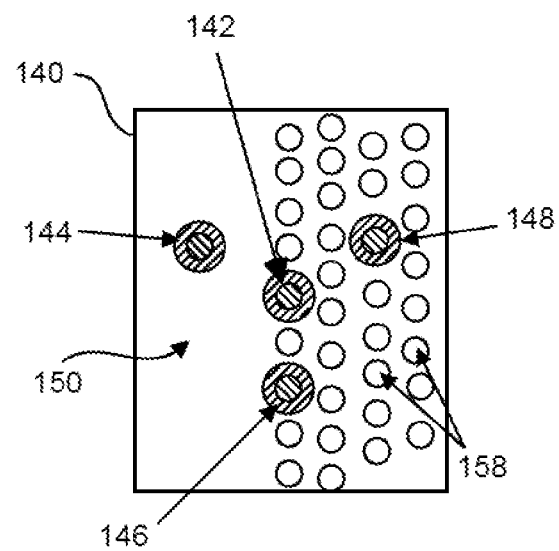

FIG. 6 illustrates designs of a multi-core optical fiber 140 having a plurality of holes 158 arranged in a cladding 150 of the optical fiber 140 to induce bending in a desired direction during positioning or implantation of the carrier member 110 into a subject's body 400. Preferably, the plurality of holes 158 are air holes in the cladding 150. The plurality of holes 158 may also form channels through the cladding 150 in any direction with respect to the optical fiber 140, such as longitudinally, orthogonally or diagonally (not shown). As shown in FIGS. 6A-B, the optical fiber 140 may include holes 158 arranged in substantially half of the cross-section of the optical fiber 140, where two cladding profiles circular (FIG. 6A) and rectangular (FIG. 6B), are presented. The introduction of the holes 158 not only further reduces the stiffness of the optical fiber 140, but also makes the fiber 140 prone to bend in one specific direction. The rectangular cladding also makes the fiber 140 tend to bend in one specific direction. Such direction is designed to follow the normal direction of the scala tympani channel 440 as shown in FIG. 2. Due to the existence of the holes 158 in one side, the stiffness of the half part with holes 158 is smaller than the other half, therefore, the optical fiber 140 is prone to bend towards the low-stiffness side. This intended bending direction helps to reduce the possibility of trauma during implantation of the optical fiber 140 in a medical implant 100, preferably, a cochlear implant. The number, size, shape and location of the holes 158 can be used to tailor the flexibility and/or stiffness of the optical fiber 140 in different bending directions.

In some embodiments, the multi-core optical fiber 140 includes a cladding 150 that is shaped to induce bending in a desired direction during positioning or implantation of the carrier member 110 into a subject's body 400. The cladding 150 can have different cross-sectional shapes or profiles to tailor the stiffness of the fiber 140 in different bending directions. A cross-section of the cladding may include a circular (FIG. 6A) or rectangular (FIG. 6B) shape, or alternatively, square, triangular, oval or elliptical shapes. The different cladding shapes advantageously allow the medical device 100 to be inserted into the subject's body 400 with reduced trauma or damage to the internal or surrounding tissues of the subject's body 400. This is particularly beneficial where the medical device 100 is a cochlear implant for insertion into the narrow diameter and length scala tympani 440 of the cochlea 430 with reduced or minimal trauma.

The multi-core optical fiber 140 is preferably silica glass based. However, other materials can be utilised to fabricate the fiber with aforementioned designs shown in FIGS. 6A-B. The pure silica glass as cladding 150 can be replaced by pure Poly(methyl methacrylate) (PMMA), and the silica core rod doped with germanium can be replaced by the PMMA doped with diphenyl sulfide (DPS), trans-4-stilbenemthanol (TS), diphenyl disulphide (DPDS) individually or mixed. Instead of using the stack-and-draw technique, the casting method can be used to make the cladding rod with certain holes, e.g., the arrangement with four bores, and the four core canes with dopants are inserted in the four bores. The index of the PMMA typically is approximately 1.5 at the wavelength of 850 nm, and the core index can be increased slightly by controlling the dopant concentration.

Alternatively, the polymer material can also be ZEONEX cyclo olefin polymer (COP), which is commercially available, such as from ZEON Corporation. Two types of the ZEONEX can be used, e.g., E48R and 480R, which have refractive indices of 1.531 and 1.525, respectively. Both materials have similar glass-transition temperature (Tg~139°). With these two ZEONEX materials, the 480R type can be used as the cladding part, and E48R can be the core part. These two materials can be used to fabricate the multi-core optical fiber 140 with design shown in FIG. 5A, the standard step-index approach. Also, using one of the ZEONEX materials, the multi-core optical fiber 140 with design shown in FIG. 5C can be fabricated, where the air holes 156 are prepared by casting method.

Figure 7:
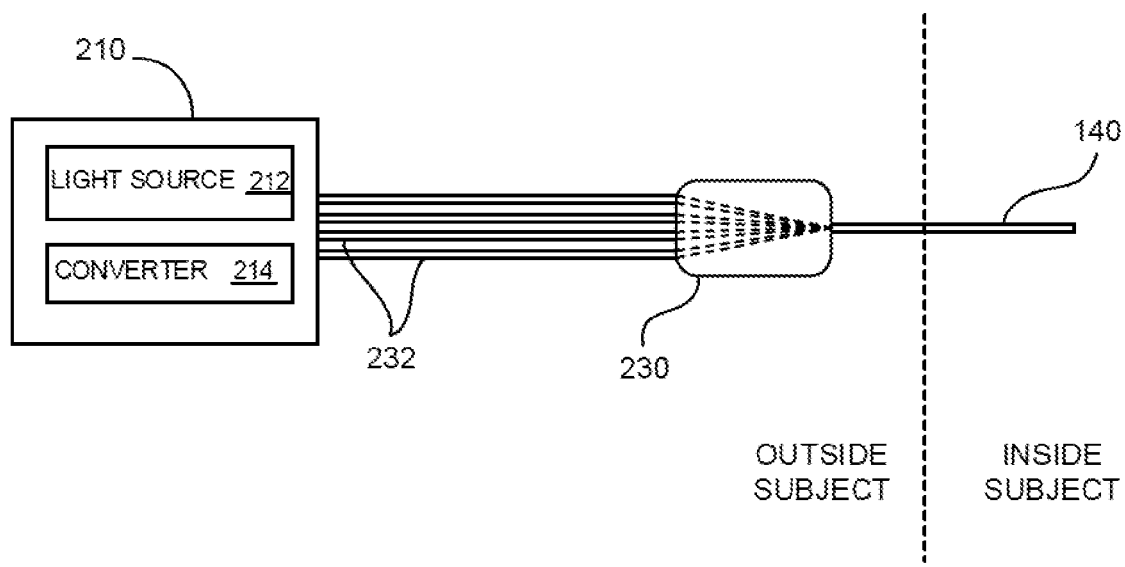
FIG. 7 is a schematic illustration showing coupling of a medical device having a multi-core optical fiber to a multi-channel interrogator according to some embodiments of the invention.

FIG. 7 is a schematic illustration showing coupling of a medical device 100 having a multi-core optical fiber 140 with a multi-channel interrogator 210 according to some embodiments of the invention. To interrogate the sensing signal from the FBG sensor array 130 disposed in the carrier member 110, and preferably embedded in the multi-core optical fiber 140, each core 142, 144, 146 and 148 of the multi-core optical fiber 140 can be connected to one single mode fiber (SMF) 232 via a fiber fan-in/out coupler 230. Fiber fan-in/out 230 is a fiber combiner that combines multiple standard single mode fibers to one specific multi-core fiber 140. FIG. 7 illustrates a connection between the multi-core optical fiber 140 and the fan-in/out 230. The common end (i.e., multi-core fiber) is connected to the multi-core optical fiber 140 and all of the multi-cores are aligned precisely. The multiple SMF 232 ends are connected to the channels of the interrogator 210, one SMF 232 to one channel. As an embodiment of the four-core multi-core fiber 140 mentioned in FIG. 3, each core 142, 144, 146 and 148 can be connected to one channel of the interrogator 210 via the fan-in/out 230. The common fiber of fan-in/out can be a standard seven-core multi-core fiber 140 or a customized four-core multi-core fiber 140. When using the standard seven-core multi-core fiber, four cores will be selected and scaled to match the position and separation of the four-core multi-core fiber 140. In alternative embodiments, the coupling device 230 may include a butt-coupling device that directly couples the optical light to each core of the multi-core optical fiber 140 (not shown).

Figure 8:
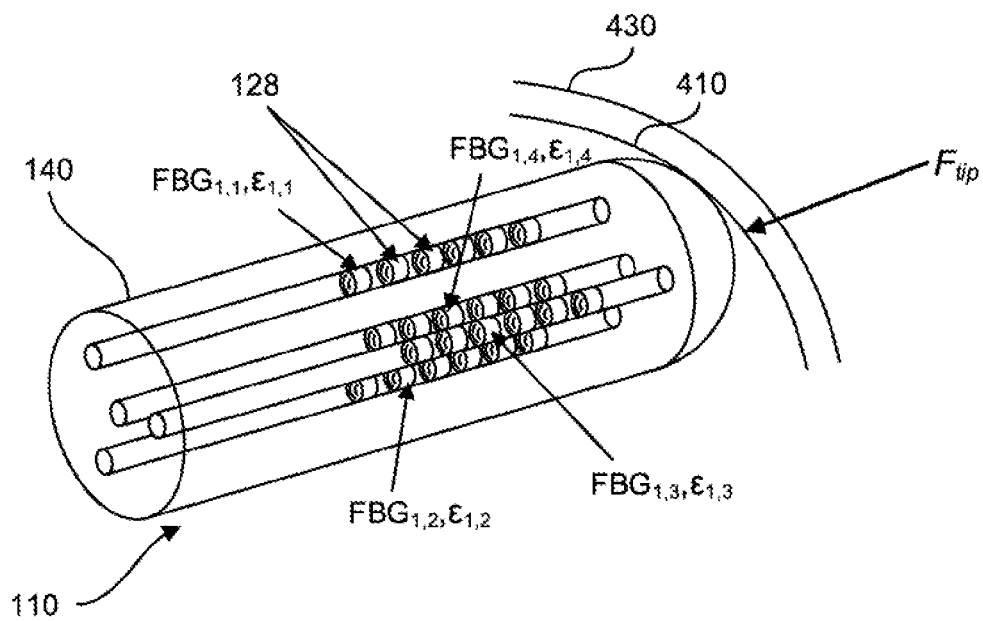
FIG. 8 is a perspective view of a multi-core optical fiber with a FBG in each core at a distal tip and showing tip force measurement based on the grating inscribed in the four cores according to some embodiments of the invention.

FIG. 8 is a perspective view of a multi-core optical fiber 140 with a FBG 128 at the insertion end or tip 114 of the medical device 100 and showing tip force measurement based on the grating inscribed in the four cores according to some embodiments of the invention. The first group of FBGs (i.e., $FBG_{1,i}$) is placed at the insertion or distal end 114 of the carrier member 110. $FBG_{1,1}$, $FBG_{1,2}$, $FBG_{1,3}$, and $FBG_{1,4}$, correspond to the four FBGs written in the outer three cores 144, 146 and 148, and the central core 142 (i=4), respectively. When the tip end 114 touches the subject's body 400, such as internal tissues 410 at the target or implantation region 420 as shown in FIG. 8, a certain contact force $F_{tip}$ is induced to the optical fiber 140 and therefore, the medical device tip 114. For cochlear implants 100, this typically involves the tip end 114 touching the cochlear wall. To simply the model, the FBGs 128 close to the distal end 114 are assumed under compression stress due to the pressure of the tip force $F_{tip}$. The Bragg wavelength of each FBG 128 shows a wavelength shift, i.e. $\Delta\lambda_{1,1}$, $\Delta\lambda_{1,2}$, $\Delta\lambda_{1,3}$, $\Delta\lambda_{1,4}$, corresponding to the strain on each core 142, 144, 146 and 148. Therefore, the measured tip force can be deduced as $$F_{tip}=S\cdot E\cdot \bar{\varepsilon},$$

where S is the cross-sectional area of the multi-core optical fiber 140, E is the Young's modulus of the fiber 140, and $\bar{\varepsilon}$ is the average strain induced at the distal tip 114, which can be obtained via:

$$\bar{\varepsilon}=\frac{1}{4}\sum_{i=1}^{4}\eta_{1,i}\cdot\Delta\lambda_{1,i}$$

where $\eta_{1,i}$ is a coefficient between the strain and the Bragg wavelength of each FBG 128. Those coefficients can be calibrated during the calibration test as discussed below in relation to FIG. 10.

Figure 9:
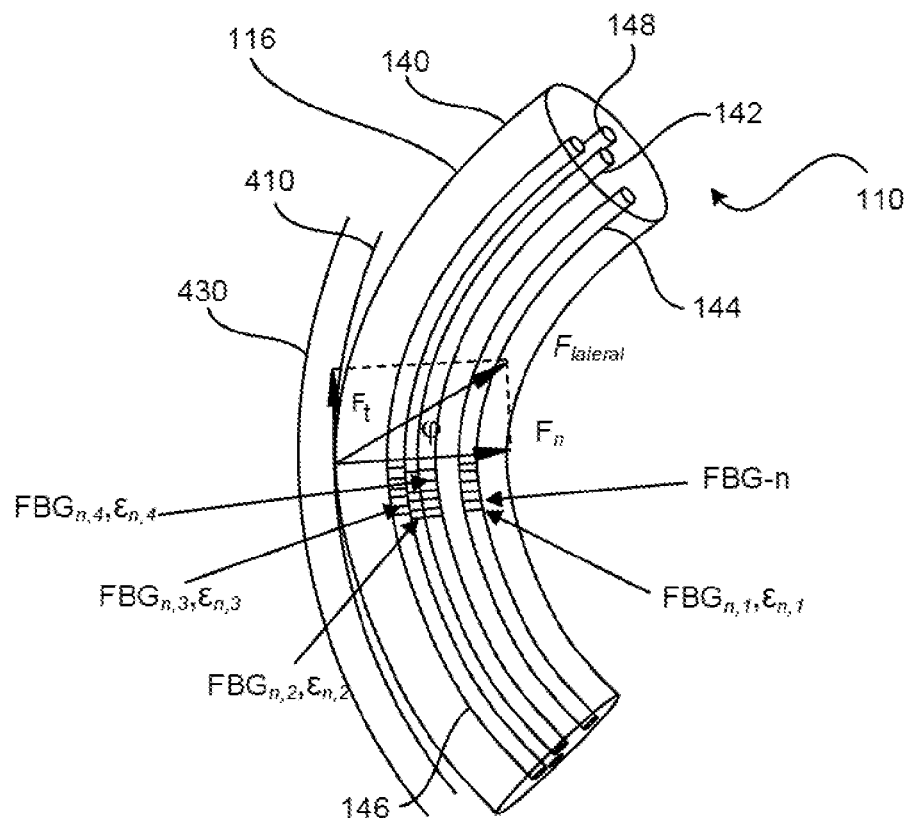
FIG. 9 is a schematic illustration showing a multi-core optical fiber with a FBG in each core along a length of the optical fiber and the lateral force and position measurement based on the grating according to some embodiments of the invention.

FIG. 9 is a schematic illustration showing a multi-core optical fiber 140 with a FBG grating along a length of the optical fiber 140 and the lateral force and position measurements based on the grating according to some embodiments of the invention. The measurement of lateral force and the position occurs via the FBGs 128 in the middle part of the medical device 100 as shown in FIG. 9. Take the $FBG_{n,i}$ at the location n as an example, the four FBGs are $FBG_{n,1}$, $FBG_{n,2}$, $FBG_{n,3}$, $FBG_{n,4}$, where $FBG_{n,4}$ is the one in the central core 142. When the fiber 140 is subject to the bending and lateral force at the same time, the induced strain on all the FBGs 128 can be a sum of the strain caused by bending and the lateral force. The lateral force ($F_{lateral}$) can be divided to provide the friction force ($F_t$) and the normal force ($F_n$). For cochlear implants 100, friction force is typically induced when the implant 100 slides on the inner wall of cochlea 430 during implantation, and also induced because of the fluid in the cochlea 430. The force that may cause trauma is the normal force, i.e. $F_n$, which can be expressed by $F_n=F_t/\tan(\varphi)$. Since the central core 142 is located in the neutral plane, it is less prone to have strain induced by bending. Thus, the strain on the central core 142 can be assumed to come from the friction force with respect to the inner wall and fluid. The friction force can be expressed as: $F_t=S\cdot E\cdot \varepsilon$, where S is the cross-sectional area of the multi-core optical fiber 140, E is the Young's modulus of the multi-core optical fiber 140 and $\varepsilon$ is the total strain at the FBG-n location. The total $\varepsilon$ can be expressed by the strain on the FBG 128 inscribed in the central core 142, i.e. $\varepsilon=\varepsilon_{n,4}$, which can be measured by the centre $FBG_{n,4}$. Therefore, the friction force can be measured via the central core 142 grating, i.e. $F_t=S\cdot E\cdot \eta_{n,4}\cdot\Delta\lambda_{n,4}$, where $\eta_4$ is a coefficient between the strain and the Bragg wavelength shift that can be calibrated in experiment (see FIG. 10).

The strain on the outer cores 144, 146 and 148 is induced by the bending and the friction, thus the friction effect has to be excluded when determining the bending. The bending-induced Bragg wavelength on the outer cores 144, 146 and 148 can be expressed by:

$$\Delta\lambda_{n,1}^{b}=\Delta\lambda_{n,1}-\Delta\lambda_{n,4}$$

$$\Delta\lambda_{n,2}^{b}=\Delta\lambda_{n,2}-\Delta\lambda_{n,4}$$

$$\Delta\lambda_{n,3}^{b}=\Delta\lambda_{n,3}-\Delta\lambda_{n,4}$$

Then, the bending induced strain on the outer cores 144, 146 and 148 can be deduced as:

$$\varepsilon_{n,1}^{b}=\eta_{n,1}\Delta\lambda_{n,1}^{b}$$

$$\varepsilon_{n,2}^{b}=\eta_{n,2}\Delta\lambda_{n,2}^{b}$$

$$\varepsilon_{n,3}^{b}=\eta_{n,3}\Delta\lambda_{n,3}^{b}$$

The bending curvature can be written as: $\kappa_n = \varepsilon_{max}/d$, where $\varepsilon_{max}$ is the total bending strain of the fiber 140, d is the distance between outer core 144, 146 and 148 and the central core 142. The total bending strain ($\varepsilon_{max}$) can be calculated by the measured strain on outer cores 144, 146 and 148, which is deduced as:

$$\varepsilon_{max} = \text{sgn}\{(\varepsilon_{n,1}^b - \varepsilon_u) \cdot \sin \varphi\} \cdot \sqrt{\frac{2}{3}\sum_{i=1}^{3}(\varepsilon_{n,i}^b - \varepsilon_u)^2}$$

where, $$\varepsilon_u = \frac{\varepsilon_{n,1}^b + \varepsilon_{n,2}^b + \varepsilon_{n,3}^b}{3}$$

$$\varphi_n = \arctan\left(\frac{\sqrt{3} \cdot (\varepsilon_{n,1}^b - \varepsilon_u)}{\varepsilon_{n,2}^b - \varepsilon_{n,3}^b}\right)$$

The bending angle $\varphi_n$ can also be used to obtain the lateral force ($F_{lateral}$) With the information of bending curvature ($\kappa_n$) and angle ($\varphi_n$), the position or shape of the device 100 can be reconstructed via the known Frenet-Serret formulas. Eventually, the lateral force ($F_{lateral}$) as well as the position of device 100 with FBG sensor array 130 disposed or embedded therein can be obtained.

Figure 11:
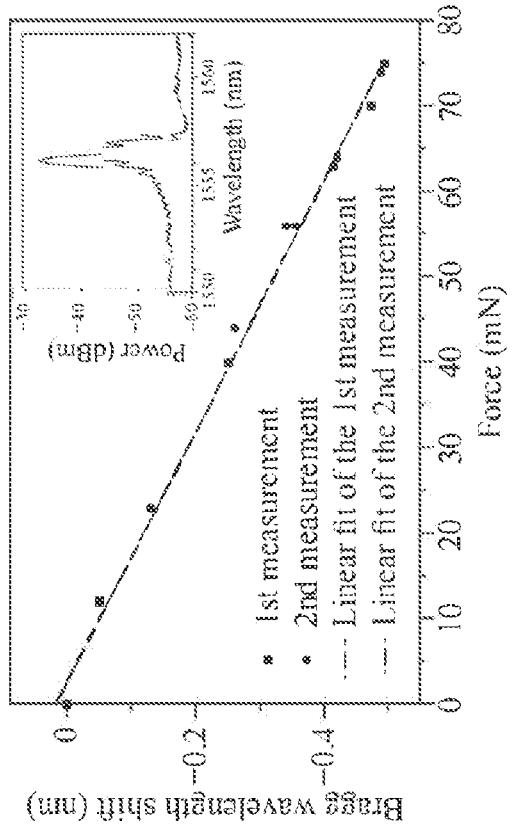
FIG. 11 is a chart showing results of the calibration using the experimental arrangement of FIG. 10.
Figure 10:
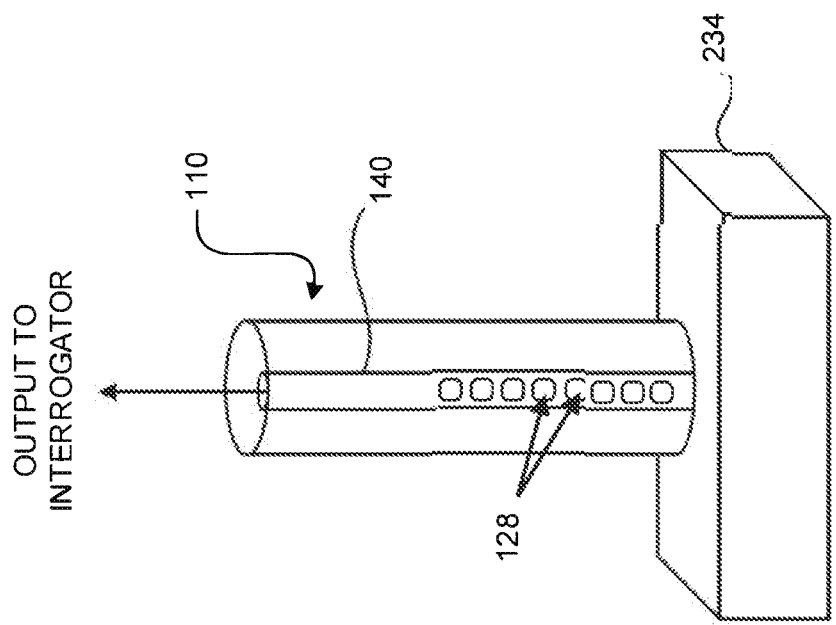
FIG. 10 is a schematic illustration of an experimental arrangement to calibrate the coefficient of the tip force and grating signal according to some embodiments of the invention.

FIG. 10 is a schematic illustration of an experimental arrangement to calibrate the coefficient of the tip force and grating signal according to some embodiments of the invention. FIG. 11 is a chart showing results of the calibration using the experimental arrangement of FIG. 10. For cochlear implants, when the cochlear implant 100 with FBG sensor array 130 is subject to contact with the scala tympani channel 440 of the cochlea 430, the induced force on the fiber 140 can be retrieved by detecting the shift of the Bragg wavelengths of all of the FBGs 128 in the cores 142, 144, 146 and 148. To establish a relationship between the measured force and the Bragg wavelength shift, the coefficient can be determined in a calibration test. FIG. 10 illustrates one embodiment of calibrating the Bragg wavelength of one FBG 128 and the axial contact force. The FBG 128 written in a single mode fiber (SMF) with cladding diameter of 50 μm is embedded in a cylindric silicone, which is the same as the fiber 140 embedded in the silicone carrier 110 of one cochlear implant 100. The SMF is connected to an interrogator 210 to monitor the Bragg wavelength shift. The FBG 128 is compressed by a vertical translation stage 234 where a miniature force sensor is installed. The FBG 128 is under compression tension when the vertical translation stage 234 moves towards the fiber 140, resulting in a shift of the Bragg wavelength. As shown in FIG. 11, the Bragg wavelength shift follows a linear relationship with the applied force, giving a coefficient of ~0.0068 nm/m N. This means that when the force is axially applied to the tip 114 of the cochlear implant 100 with FBG sensor array 130, 1 mN force can induce a shift of 0.0068 nm in Bragg wavelength. It is worth noting that the compression strain response of one FBG 128 is the same as the tensile strain response except that the sign is different. Therefore, the force response of the FBGs 128 not at the distal end can be calibrated by pulling the FBG sensor array 130.

Figure 12:
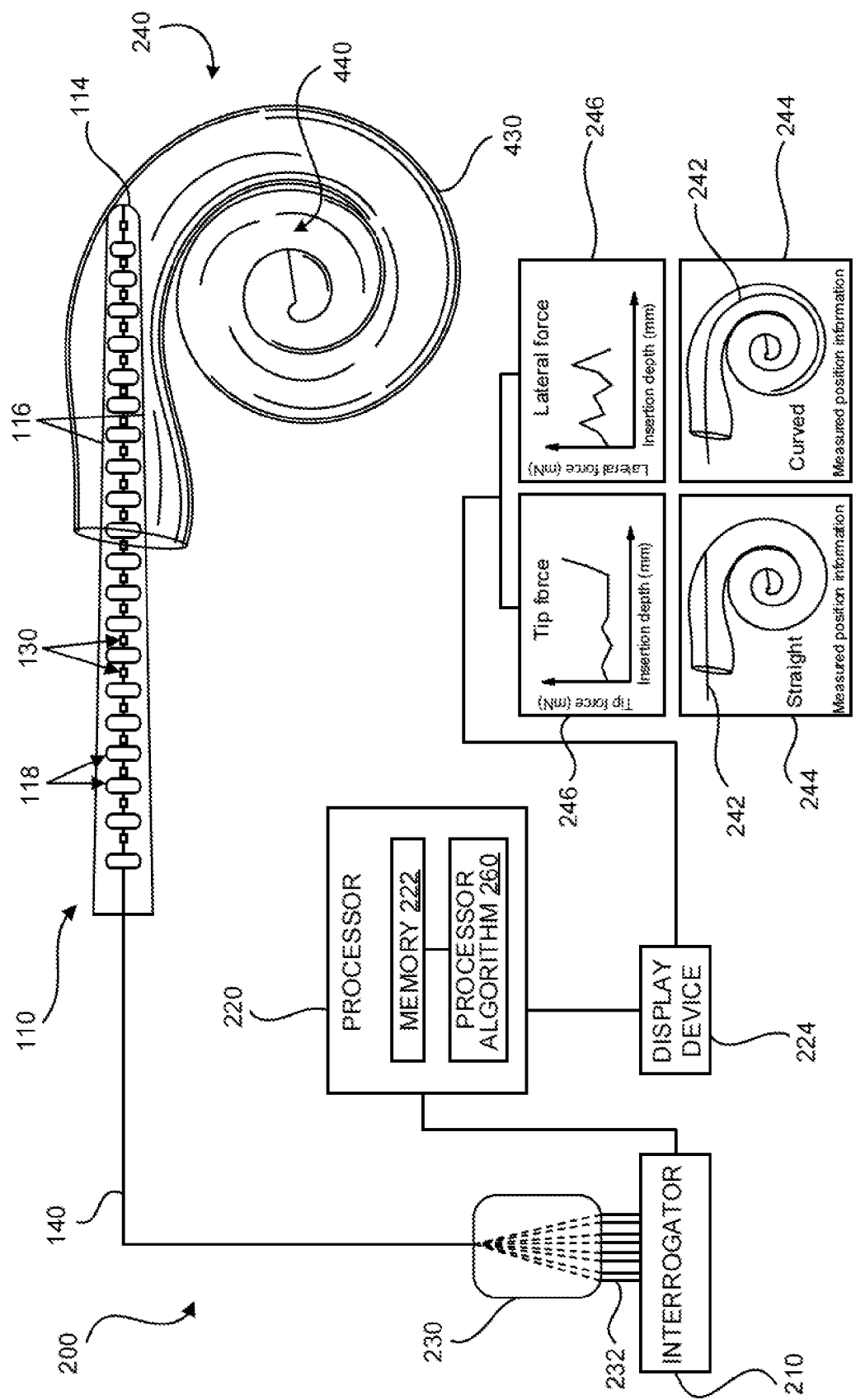
FIG. 12 is a schematic illustration showing a system for guiding positioning of a medical device in a subject's body according to some embodiments of the invention.

FIG. 12 is a schematic illustration showing a system 200 for guiding positioning of a medical device 100 in a subject's body 400 according to some embodiments of the invention. The system 200 includes a medical device 100 including: a carrier member 110 configured for positioning in the subject's body 400, the carrier member 110 including an insertion end 114 and side walls 116 that contact the subject's body 400 during positioning of the carrier member 110 in the subject's body 400; one or more operative components 118 disposed in the carrier member 110; an optical fiber 140 at least partly disposed in the carrier member 110; and at least one fiber Bragg grating (FBG) sensor array 130 associated with the optical fiber 140 and being disposed in the carrier member 110. The system 200 also includes an interrogator 210 coupled to the optical fiber 140 and configured to obtain reflection spectra data 250 from the FBG sensor array 130 during positioning of the carrier member 110 in the subject's body 400. The system 200 also includes a processor 220 configured to receive the reflection spectra data 250 from the interrogator 210 and to process the reflection spectra data 250 to determine contact forces at one or both of the insertion end 114 and along the side walls 116 of the carrier member 110 during positioning of the carrier member 110 in the subject's body 400.

In some embodiments, the medical device 100 is an implantable medical device and the carrier member 110 is configured for implantation in the subject's body 400. The system 200 may enable guidance of implantation of the medical device 100 into the subject's body 400.

In some embodiments, such as shown in FIG. 12, the system 200 is configured for guiding implantation of a cochlear implant 100 into a scala tympani 440 of a cochlea 430 of a subject. However, the system 200 may be configured for guiding positioning or implantation of various medical devices 100, as would be appreciated by a person skilled in the art. The medical device 100 and optical fiber 140 of the system 200 may include one or more features in any combination of the embodiments described above and with reference to FIGS. 1 to 11.

Preferably, the medical device 100 includes the multi-core optical fiber 140 with a plurality of FBG sensor arrays 130 as shown and described with reference to FIG. 3. The system 200 may further include a coupling device 230 for coupling each core 142, 144, 146 and 148 of the multi-core optical fiber 140 to a multi-channel interrogator 210 for separately detecting the reflection spectra 250 of the FBG sensor arrays 132, 134, 136 and 138 as shown and described with reference to FIG. 7. In FIGS. 7 and 12, the optical fiber 140 is connected to a fan-in/out coupling device 230 that separates the signals from each core into standard SMFs individually. Each SMF 232 is connected to one channel of the interrogator 210. The interrogator 210 is configured to retrieve the reflected optical spectra 250 of the FBGs 128, which includes the Bragg wavelength shifts of all the FBGs 128 (e.g., each FBG 128 in the FBG sensor arrays 132, 134, 136 and 138).

Preferably, the interrogator 210 includes a light source 212 and an opto-electrical converter 214 for retrieving the reflected optical spectra 250 as shown in FIG. 7. The light source 212 generates light for transmission to the FBGs 128 via the FBG sensor array 130 and optical fiber 140. The opto-electrical converter 214 receives light reflected back from the FBGs 128, along the same light path. The processor 220 may receive the raw data in terms of the Bragg wavelength shifts of all the FBGs (e.g., each FBG 128 in the FBG sensor arrays 132, 134, 136 and 138) from the interrogator 210. The processor 220 may include a memory 222 storing one or more algorithms 260 for a mathematical relationship between the wavelength and/or intensity against a measure of the strain (or force) applied to the FBG 128 as shown in FIG. 12. Preferably, the algorithms 260 include those shown and described with reference to FIGS. 8 and 9 to calculate the contact force and/or position of the insertion end 114 and/or side walls 116 of the carrier member 110. The processor 220 may then perform the algorithms 260 described with reference to FIGS. 8 and/or 9 and output data corresponding to the contact force and/or position of the carrier member 110.

In some embodiments, the processor 220 is configured to receive position data of a target or implantation region 420 of the subject's body 400 prior to positioning or implantation of the device 100. For cochlear implants 100, the position data may include the position of a scala tympani 440 of a cochlea 430 of the subject. The processor 220 may be further configured to process data corresponding to the position of the carrier member 110 relative to the position data of the target or implantation region 420 to determine a depth of positioning or implantation of the carrier member 110 in the subject's body 400. Preferably, the processor 220 is configured to determine angular position of the carrier member 110 in the subject's body 400. Furthermore, the processor 220 may be configured to determine an angular depth of insertion or implantation of the carrier member 110 in the subject's body 400. This may assist the surgeon or operator in guiding positioning or implantation of the carrier member 110 based on feedback received from the sensing system 200.

In some embodiments, the processor 220 is further configured to receive physiological data of the subject prior to positioning of the carrier member 110 in the subject's body 400. The physiological data may include, for example, pre-operative hearing data of the subject. This is particularly useful where the medical device 100 to be guided for positioning or implantation in the subject's body 400 is a cochlear implant. The processor 220 may be further configured to process the physiological data with the position data of the target or implantation region 420 to determine a desired angle of insertion or implantation of the carrier member 110 into the cochlea 430. Advantageously, the surgeon or operator may perform steps including rotating or altering a trajectory of the insertion depending on the desired angle of insertion or implantation. This may also depend on the specific operative components 118 of the medical device 100, such as the electrode array type (e.g., straight or curved) and the stage of implantation or insertion of the device 100 into the subject's body 400.

The processor 220 may be further configured to receive an image 240 of the target or implantation region 420 of the subject's body 400 prior to positioning or implantation of the device 100 (see also FIG. 2). The image 240 may include an X-ray image, or imaging from other modalities such as ultrasound or MRI to name a few. An exemplary image 240 is shown in FIG. 12 which depicts a scala tympani 440 of a cochlea 430 of a subject. The carrier member 110 of medical device 100 is shown being inserted or advanced into the scala tympani 440. The processor 220 may be further configured to reconstruct an image of the carrier member 110 using the data corresponding to the position of the carrier member 110. The processor 220 may be further configured to overlay the reconstructed image 242 on the image 240 of the target or implantation region 420 of the subject's body 400, and to output data representing an image 244 of the position of the carrier member 110 relative to the target or implantation region 420 of the subject's body 400 as shown in FIG. 12.

In some embodiments, the system 200 further includes a display device 224 which is configured to display data processed by the processor 220. The display device 224 may be a graphical display screen, and may optionally, be a display screen of a computer, tablet or mobile phone or the like, as would be appreciated by a person skilled in the art. The processor 220 may be configured to display on the display device 224 an infographic of the contact forces on the carrier member 110 relative to the depth of positioning or implantation of the carrier member 110 in the subject's body 400. The infographic may include a chart 246 showing the contact forces relative to the insertion positioning or depth of the carrier member 110. The processor 220 may be configured to display two charts, a first chart showing the contact force on the insertion end or tip 114 ($F_{tip}$) relative to the insertion depth, and a second chart showing the contact force on the side walls 116 ($F_{lateral}$) relative to the insertion depth as illustrated in FIG. 12. In some embodiments, the insertion depth displayed is the angular depth of insertion of the carrier member 110 determined by the processor 220.

The processor 220 may also be configured to display on the display device 224, the image 244 of the position of the carrier member 110 relative to the target or implantation region 420 of the subject's body 400. This is illustrated in FIG. 12 in the images 244 shown below the charts of the tip force and lateral force. The images 244 illustrate the carrier member 110 prior to bending through the scala tympani 440, where the device 100 is straight, and during/after bending in the scala tympani 440, where the device 100 has bent and is curved around the scala tympani 440. Advantageously, since the FBG sensor array 130 may be fabricated in a low-bending loss optical fiber 140, the sensing signal extracted by the interrogator 210 has neglectable loss in power even though the fiber 140 may be bent to a diameter as small as approximately 3 mm inside the cochlea 430.

Ideally, the processor 220 is further configured to process the data received from the interrogator 210 in real-time to provide contact force and/or position information of the carrier member 110 during positioning or implantation in the subject's body 400. During implantation surgery, the display device 224 may be configured to provide the real-time monitoring information of force and/or position of the medical device 100 during positioning or implantation in the subject's body 400. The tip contact force ($F_{tip}$) and lateral force ($F_{lateral}$) may be provided in a chart 246 given with respect to the actual insertion depth, preferably the angular insertion depth, of the implant as shown in FIG. 12. The actual position, preferably the angular position, of the medical device 100 in the subject may be shown on an image 240 of the target or implantation region 420 prior to surgery, such as an X-ray image of the cochlea as shown in FIG. 12. The real-time force and position information may allow a surgeon or operator to determine whether the medical device 100 has contacted internal tissues 410 of the subject's body 400 (such as the cochlear inner wall 410 for cochlear implants 100 as shown in FIG. 2) and the location of contact.

In some embodiments, the processor 220 is further configured to detect when the contact forces on the carrier member 110, namely one or both of the tip contact force ($F_{tip}$) and lateral force ($F_{lateral}$), exceed a threshold value over which damage to internal tissues 410 of the subject's body 400 is likely to occur. Typically, trauma may occur when the contact force on the cochlear inner wall for cochlear implants exceeds a threshold value of approximately 30 mN. The various threshold values for incurring damage or trauma to internal tissues 410 of the subject's body 400 would be appreciated by a person skilled in the art. When the threshold value is exceeded, the processor 220 is configured to output a notification signal of excessive contact forces on the internal tissues 410 of the subject's body 400. For example, this may include an alarm signal on the display device 224 indicating that the threshold has been exceeded. The alarm signal may include an indicator light or message to the surgeon or operator. Additionally/alternatively, the processor 220 may be further configured to output data representing instructions to perform a number of steps. The processor 220 may output the instructions on the display device 224. The instructions may include one or more of: stop advancing the carrier member 110 into the subject's body 400, at least partially withdraw the carrier member 110 from the subject's body 400, adjust an insertion angle of the carrier member 110 relative to the subject's body, and re-insert the carrier member 110 into the subject's body 400. The notification signal and/or instructions outputted by the processor 220 may inform the surgeon or operator of appropriate action to prevent trauma or damage to the internal tissues 410 of the subject's body 400.

Occasionally, an undesirable effect may occur during implantation of a cochlear implant 100 which is fold-over of the tip 114. Such occurrence currently can only be detected after surgery using fluoroscopy. The FBGs 128 near the tip 114 of the cochlear implant 100 can provide real-time monitoring of bending of the tip 114 during the insertion process, and therefore can alert the surgeon to prevent excessive bending of the tip 114 (see FIGS. 3 and 12). In some embodiments, the first FBG 128 inscribed in the optical fiber 140 at the tip 114 is configured to measure contact force at the insertion end or tip 114 in terms of applied force value and direction, and also to monitor bending of the tip 114. The rest of the FBGs 128 along the length of the FBG sensor array 130 may be configured to measure position along the side walls 116 in order to determine the curvature and orientation of the cochlear implant 100, and thus enable reconstruction of the shape of the cochlear implant 100 which determine its actual position. For a certain FBG 128 in the middle of the carrier member 110 instead of the distal tip 114, the lateral force can be retrieved by compensating the curvature effect using the FBG 128 written in a central core 142. The processor 220 of the system 200 may be further configured to one or both of: process the data to detect when the contact forces on the carrier member 110 are indicative of fold-over of a tip of the electrode array 118, and to output a notification signal, such as on the display device 224, of fold-over of the tip.

Figure 13:
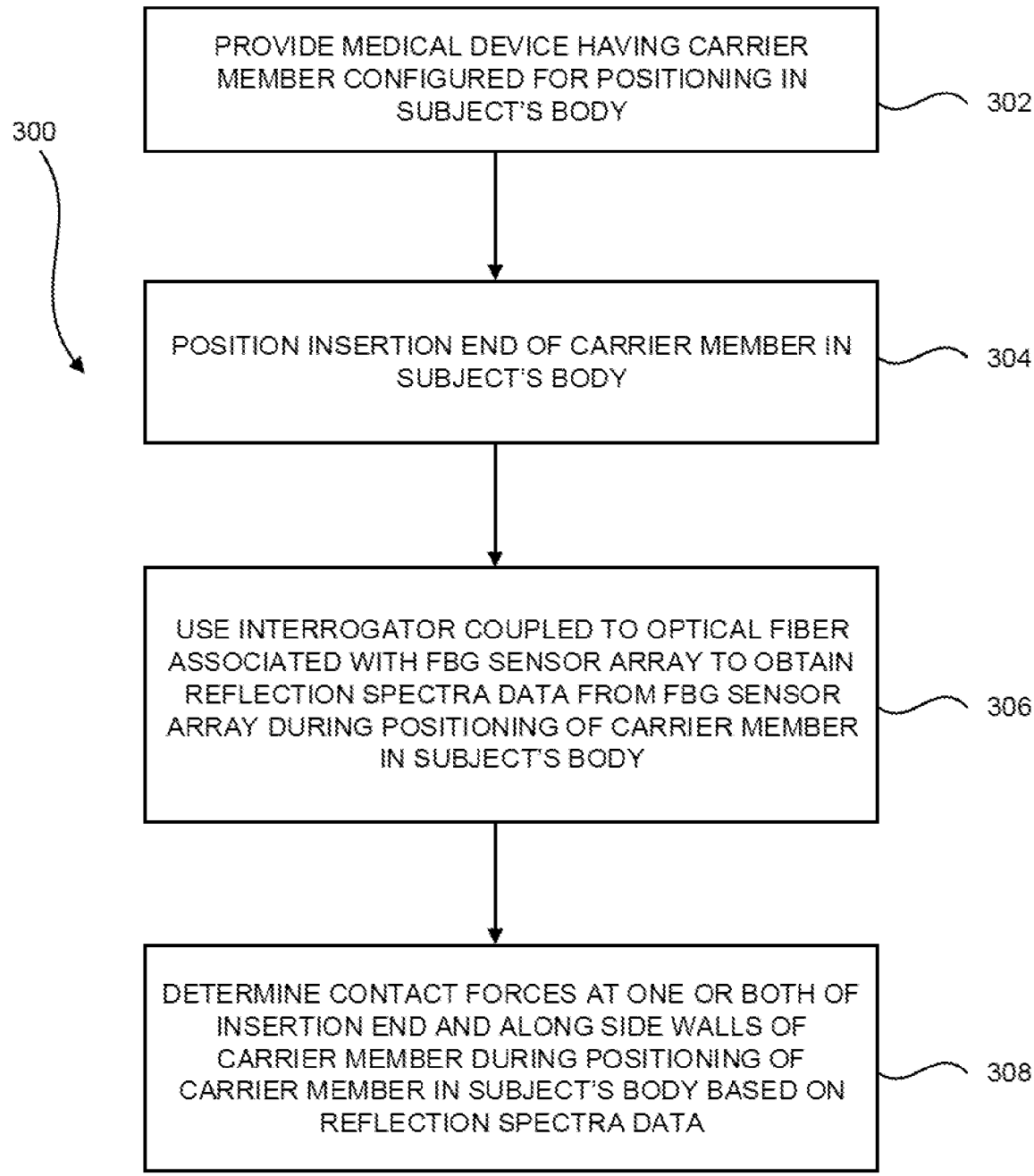
FIG. 13 is a flow chart illustrating steps of a method for guiding positioning of a medical device in a subject's body according to some embodiments of the invention.

FIG. 13 is a flow chart illustrating steps performed by a processor 220 in the system 200 of FIG. 12 or steps in a method 300 for guiding positioning of a medical device 100 in a subject's body 400 according to some embodiments of the invention. In these embodiments, the system 200 and method 300 are provided for guiding implantation of a cochlear implant 100 into a subject's body 400.

Before the surgery, the method 300 includes imaging an implantation region 420 of the subject's body 400, which includes the scala tympani (ST) channel 440 of the cochlea 430 in this embodiment. The imaging modality may include X-ray scanning, although other modalities including ultrasound and MRI may be employed. The imaging enables the position of the implantation region 420 to be obtained, which is received by a processor 220 as a shape reference.

The next step of the method 300 includes beginning the implantation surgery which involves the surgeon or operator inserting the carrier member 110 of the implant 100 into the cochlea 430. Preferably, the FBG 128 at the distal tip 114 of the cochlear implant 100 measures the tip force ($F_{tip}$) and the system 200 determines whether the contact force value exceeds a threshold over which damage or rupture to the cochlear wall 420 is likely to occur. The processor 220 is also configured to determine in real-time the shape/position of the inserted carrier member 110 of the implant 100, and determine whether the implant 100 contacts the inner wall 420 of the cochlea 430 by comparing with the shape reference (i.e., the image of the implantation region 420 received prior to surgery).

If the tip force exceeds the limit or threshold, the processor 220 outputs a notification signal of excessive contact forces on the cochlear wall 410. The processor 220 may also output instructions to the surgeon or operator to stop insertion of the carrier member 110 into the subject's body 400, at least partially withdraw the carrier member 110 from the subject's body 400, adjust an insertion angle of the carrier member 110 relative to the subject's body 400 and re-insert the carrier member 110 into the subject's body 400. The surgeon or operator may view the instructions on a display device 224, together with charts showing the tip force and an image showing the real-time position, to precisely adjust an insertion angle of the carrier member 110 and re-insert the carrier member 110 into the subject's body 400.

If the tip force does not exceed the limit or threshold, the operator continues to insert the implant 100 into the subject's body 400. The processor 220 is then configured to monitor the real-time detected lateral force. If the lateral force on the carrier member 110 is exceeded, the operator is instructed to pull back and adjust the implant 100. Otherwise, the operator continues inserting the implant 100 and the method 300 continues another iteration until a desired length of the implant 100 is inserted. In the meantime, when the system 200 determines that the inserted implant 100 has contacted the inner wall, then the tip force as the lateral force will be assessed and if they are over limit, similar adjustments may be conducted, until the surgery is finished.

FIG. 13 is a flow chart illustrating steps of a method 300 for guiding positioning of a medical device 100 in a subject's body 400 according to some embodiments of the invention. The method 300 includes the step 302 of providing a medical device 100 including: a carrier member 110 configured for positioning in the subject's body 400, the carrier member 110 including an insertion end 114 and side walls 116 that contact the subject's body 400 during positioning of the carrier member 110 in the subject's body 400; one or more operative components 118 disposed in the carrier member 110; an optical fiber 140 at least partly disposed in the carrier member 110; and at least one fiber Bragg grating (FBG) sensor array 130 associated with the optical fiber 140 and being disposed in the carrier member 110. The method 300 also includes the step 304 of positioning the insertion end 114 of the carrier member 110 in the subject's body 400. The method 300 also includes the step 306 of using an interrogator 210 coupled to the optical fiber 140 to obtain reflection spectra data 250 from the FBG sensor array 130 during positioning of the carrier member 110 in the subject's body 400. The method 300 also includes the step 308 of determining contact forces at one or both of the insertion end 114 and along the side walls 116 of the carrier member 110 during positioning of the carrier member 110 in the subject's body 400 based on the reflection spectra data 250 from the interrogator 210.

In some embodiments, the medical device 100 is an implantable medical device and the carrier member 110 is configured for implantation in the subject's body 400. The method 300 may enable guidance of implantation of the medical device 100 into the subject's body 400. The method 300 may include the step of advancing the insertion end 114 into the subject's body 400.

In some embodiments, the method 300 may guide implantation of a cochlear implant 100 into a scala tympani 440 of a cochlea 430 of a subject. However, in other embodiments the method 300 may guide positioning or implantation of different medical devices 100, as would be appreciated by a person skilled in the art. The medical device 100 and optical fiber 140 of the method 300 may include one or more features in any combination of the embodiments described above and with reference to FIGS. 1 to 12.

The step 304 of positioning an insertion end 114 of the carrier member 110 in the subject's body 400 may be performed by a surgeon or operator during e.g., implantation surgery on a subject. The step 304 may include inserting the insertion end 114 into the subject's body 400 through an orifice and advancing the carrier member 110 into the subject's body 400 until a desired insertion length is reached.

The step 306 of using an interrogator 210 may be performed by a surgeon or operator in which they operate the interrogator 210 to retrieve the reflection spectra data 250. The step 308 of determining contact forces is preferably performed by a processor 220, such as described above with reference to the system 200 of FIG. 12. However, the contact forces can also be determined by the surgeon or operator through calculation of contact forces using the mathematical algorithm described herein with reference to FIG. 8 and reflection spectra data 250 from the interrogator 210.

Preferably, the medical device 100 includes the multi-core optical fiber 140 with a plurality of FBG sensor arrays 130 as shown and described with reference to FIG. 3. The method 300 may further include the step of coupling each core 142, 144, 146 and 148 of the multi-core optical fiber 140 to the interrogator 210 by a coupling device 230 for separately detecting the reflection spectra 250 of the FBG sensor array 132, 134, 136 and 138 in each core. The method 300 may further include the step of determining position of one or both of the insertion end 114 and the side walls 116 of the carrier member 110 during positioning of the carrier member 110 in the subject's body 400 based on the reflection spectra data 250 from the interrogator 210. Preferably, the step of determining position is performed by a processor 220, such as described above with reference to the system 200 of FIG. 12. However, the position can also be determined by the surgeon or operator through calculation of position using the mathematical algorithm described herein with reference to FIG. 9 and reflection spectra data 250 from the interrogator 210.

In some embodiments, the method 300 further includes the step of receiving, using a processor 220, such as described with reference to the system 200 of FIG. 12, position data of a target or implantation region 420 of the subject's body 400 prior to positioning or implantation of the device 100. The method 300 may also include the step of processing, using the processor 220, data corresponding to the position of the carrier member 110 relative to the position data of the target or implantation region 420 to determine a depth of positioning or implantation of the carrier member 110 in the subject's body 400. Preferably, the processor 220 is configured to determine angular position of the carrier member 110 in the subject's body 400. Furthermore, the processor 220 may be configured to determine an angular depth of insertion or implantation of the carrier member 110 in the subject's body 400. This may assist the surgeon or operator in guiding positioning or implantation of the carrier member 110 based on feedback received from the sensing system 200.

In some embodiments, the method 300 further includes receiving, using the processor 220, physiological data of the subject prior to positioning of the carrier member 110 in the subject's body 400. The physiological data may include, for example, pre-operative hearing data of the subject. This is particularly useful where the medical device 100 to be guided for positioning or implantation in the subject's body 400 is a cochlear implant. The method 300 may further include, processing, using the processor 220, the physiological data with the position data of the target or implantation region 420 to determine a desired angle of insertion or implantation of the carrier member 110 into the cochlea 430. Advantageously, the method 300 may then include steps of rotating or altering a trajectory of the insertion depending on the desired angle of insertion or implantation, which may be performed by the surgeon or operator. This may also depend on the specific operative components 118 of the medical device 100, such as the electrode array type (e.g., straight or curved) and the stage of implantation or insertion of the device 100 into the subject's body 400.

The method 300 may also include the following steps performed using processor 220: receiving an image 240 of the target or implantation region 420 of the subject's body 400 prior to positioning or implantation of the carrier member 110 in the subject's body 400, reconstructing an image of the carrier member 110 using the data corresponding to the position of the carrier member 110, overlaying the reconstructed image 242 of the carrier member 110 on the image of the target or implantation region 420 of the subject's body 400 and outputting data representing an image 244 of the position of the carrier member 110 relative to the target or implantation region 420 of the subject's body 400.

In some embodiments, the method 300 further includes the step of displaying, using the processor 220, on a display device such as display device 224 of system 200, one or both of: an infographic 246 of the contact forces on the carrier member 110 relative to the depth of positioning or implantation of the carrier member 110, and an image 244 of the position of the carrier member 110 relative to the target or implantation region 420 of the subject's body 400, similar to the images 244 and infographic 246 as illustrated in FIG. 12.

Ideally, the method 300 further includes determining in real-time contact force and/or position information of the carrier member 110 during positioning or implantation of the carrier member 110 into the subject's body 400. This may involve processing the data by a processor such as the processor 220 of system 200 to enable real-time information to be provided.

In some embodiments, the method 300 further includes the step of determining when the contact forces on the carrier member 110 exceed a threshold value over which damage to internal tissues 410 of the subject's body 400 is likely to occur. When the threshold value is exceeded, the method 300 may further include the step of outputting, using a processor 220, a notification signal of excessive contact forces on the internal tissues 410 of the subject's body 400. The notification signal may be observed by a surgeon or operator during the implantation procedure. When the threshold value is exceeded, the method 300 may further include one or more of the following steps, which are performed by a surgeon or operator during the positioning or implantation surgery: stopping advancing of the carrier member 110 into the subject's body 400; at least partially withdrawing the carrier member 110 from the subject's body 400; adjusting an insertion angle of the carrier member 110 relative to the subject's body 400; and re-inserting the carrier member 110 into the subject's body 400.

In some embodiments, the medical device 100 is a cochlear implant device and the one or more operative components 118 include at least one electrode array or optical array 118 for providing stimulation to the nervous system of the subject. In this example, the method 300 may further include the steps of: determining when the contact forces on the carrier member 110 are indicative of fold-over of a tip of the at least one electrode array or optical array 118, and outputting, using a processor 220, a notification signal of fold-over of the tip. The surgeon or operator may observe the notification signal in real-time during the implantation surgery and stop advancing and/or withdraw the carrier member 110 from the subject's body 400 to unfold the tip of the electrode array or optical array 118. The carrier member 110 may then be re-inserted into the subject's body 400 for positioning or implantation.

Figure 14:
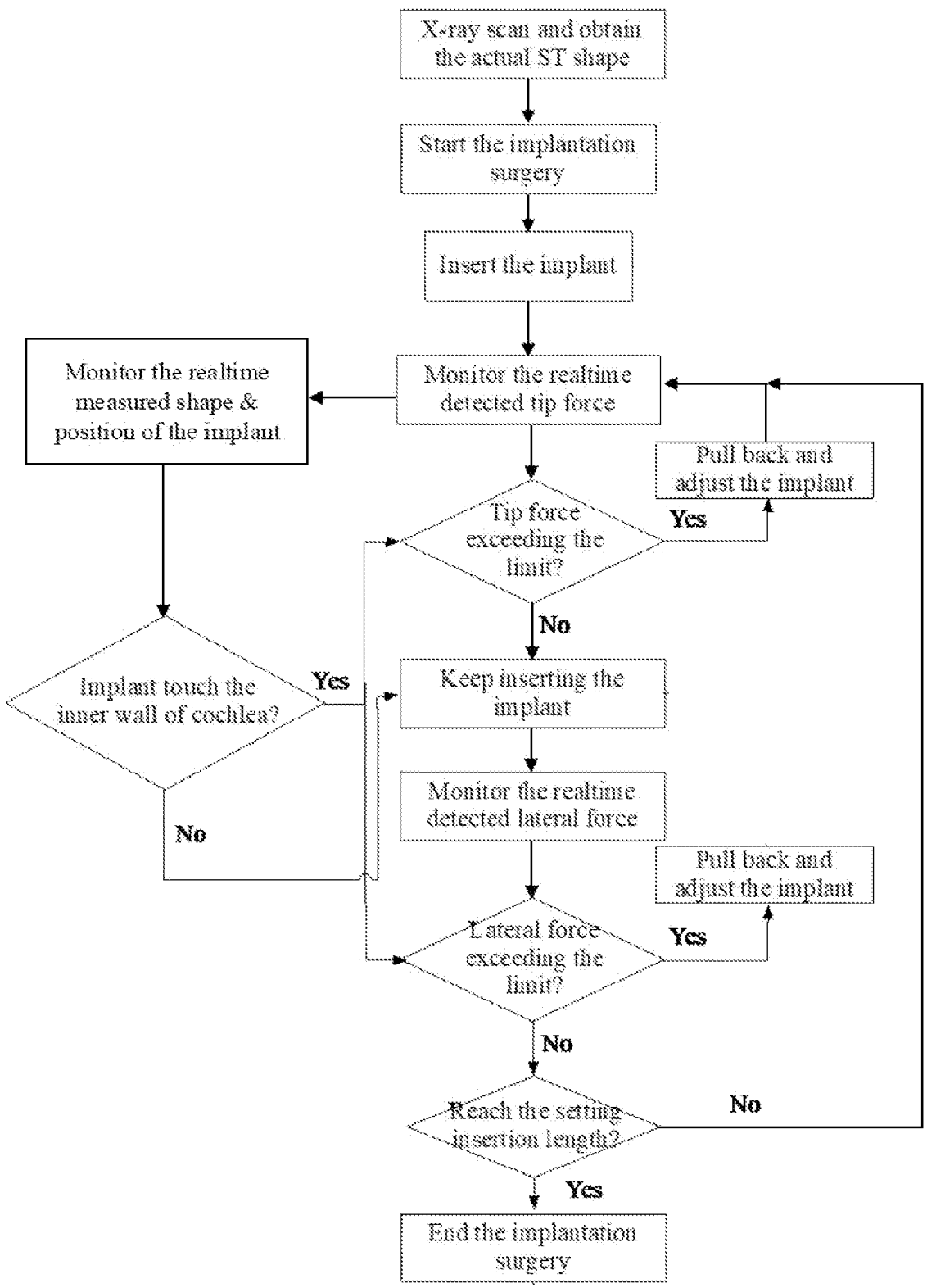
FIG. 14 is a flow chart illustrating steps performed by a processor of a system and/or steps performed in a method, both for guiding implantation of a cochlear implant into a subject's body, according to some embodiments of the invention.

FIG. 14 is a flow chart illustrating steps performed by a processor 220 of a system 200 and/or steps performed in a method 300, both for guiding implantation of a cochlear implant 100 into a subject's body 400, according to some embodiments of the invention. Before the surgery, an implantation region 420 of the subject's body 400 is imaged, which includes the scala tympani (ST) channel 440 of the cochlea 430. The imaging modality may include X-ray scanning, although other modalities including ultrasound and MRI may be employed. The imaging enables the position of the implantation region 420 to be obtained, which is received by a processor 220 as a reference of the shape of the scala tympani 440.

Implantation surgery is then started which involves the surgeon or operator inserting the cochlear implant 100 into the cochlea 430 of the subject. The detected force at the tip 114 of the cochlear implant 100 is then monitored in real-time by measuring the tip force ($F_{tip}$) and determining whether the tip force exceeds a threshold over which damage or rupture to the cochlear wall 420 is likely to occur. The shape and position of the implant 100 is also monitored, preferably simultaneously, in real-time by determining whether the implant 100 contacts the inner wall 420 of the cochlear 430 by comparing the determined implant position with the shape reference (i.e., the image of the implantation region 420 received prior to surgery).

If the tip force exceeds the limit or threshold, the surgeon or operator stops insertion of the implant 100, at least partially withdraws the implant 100 from the subject's body 400, adjusts an insertion angle of implant 100 relative to the subject's body 400 and re-inserts the implant 100 into the subject's body 400. The surgeon or operator may view charts showing the tip force and an image showing the real-time position, to precisely adjust an insertion angle of the carrier member 110 and re-insert the carrier member 110 of the implant 100 into the subject's body 400.

If the tip force does not exceed the limit or threshold, the surgeon or operator continues to insert or advance the implant 100 into the subject's body 400. The detected lateral force on side walls 116 of the cochlear implant 100 is then monitored in real-time by measuring the lateral force ($F_{lateral}$) and determining whether the lateral force exceeds a threshold or limit over which damage or rupture to the cochlear wall 420 is likely to occur. If the lateral force is exceeded, the operator or surgeon again withdraws the implant 100, adjusts an insertion angle and re-inserts the implant 100 into the subject's body 400. Otherwise, the operator continues inserting the implant 100 until a desired length of the implant 100 is inserted into the subject's body 400. The surgeon or operator may view charts showing the lateral force and an image showing the real-time position (e.g., such as shown in FIG. 12), to precisely adjust an insertion angle of the carrier member 110 of the implant 100 and re-insert the carrier member 110 into the subject's body 400. Finally, if the cochlear implant 100 is determined to contact the inner wall 420 of the cochlea 430, then the tip force and lateral force are assessed, and if they exceed the thresholds or limit, similar adjustment of the implant 100 is conducted, until the surgery is finished.

The processor 220 of the system 200 or processor used to implement certain steps of the method 300 according to embodiments of the invention may include a micro-processor or controller configured to receive data from components of the system 200 or a computing server, such as through a wireless or hard-wired connection. The processor 220 or controller may be co-located with the interrogator 210, or may be part of a stand-alone computer. The controller may include a personal computer processor such as a Celeron chip by Intel Corporation located on an ETX form factor PCB (not shown). The controller may contain or store a number of predefined protocols or steps in a non-volatile memory such as a hard drive. Protocols may be programmable by the user to implement a number of steps for the method 300, or they may be predefined. Additionally/alternatively, the processor 220 may include any other suitable processor device known to a person skilled in the art. The processor 220 and method steps performed by the processor 220 may be implemented through a controller and further in software, firmware and/or hardware in a variety of manners as would be understood by a person skilled in the art.

Embodiments of the invention provide a medical device configured to provide force sensing for guiding positioning into a subject's body, and a sensing system and method for the same. The medical device in some embodiments is a cochlear implant and the system and method guide implantation of the cochlear implant into the scala tympani of the subject. The device, system and method described herein provide force and/or position sensing of the medical device during positioning or implantation into a subject's body. The force and/or position sensing may be enabled by the medical device having one or more FBG sensor arrays with FBGs at various positions in the medical device, including at a tip of the medical device for measuring tip force, direction of force and position, and along a length thereof for measuring lateral forces and shape/position of the medical device during positioning or implantation. Advantageously, embodiments of the invention may provide real-time feedback to the surgeon or operator in terms of tip force, lateral force and shape/position of the medical device during positioning or implantation. This may enable the surgeon or operator to precisely position the medical device in the subject in a way that minimises or reduces trauma or damage to surrounding tissues of the subject during positioning or implantation in a subject.

It is to be understood that various modifications, additions and/or alternatives may be made to the parts previously described without departing from the ambit of the present invention as defined in the claims appended hereto.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components or group thereof.

It is to be understood that the following claims are provided by way of example only, and are not intended to limit the scope of what may be claimed in any future application. Features may be added to or omitted from the claims at a later date so as to further define or re-define the invention or inventions.

The invention claimed is:

1. A medical device including:
a carrier member configured for positioning or implantation in a subject's body, the carrier member including an insertion end and side walls that contact the subject's body during positioning or implantation of the carrier member in the subject's body;
one or more operative components disposed in the carrier member;
an optical fiber at least partly disposed in the carrier member, the optical fiber comprising a core comprising a first cyclo olefin polymer having a first refractive index and a cladding comprising a second cyclo olefin polymer having a second refractive index that is less than the first refractive Index; and
at least one fiber Bragg grating (FBG) sensor array associated with the optical fiber and being disposed in the carrier member,
wherein the at least one FBG sensor array is configured for measuring contact forces at one or both of the insertion end and along the side walls of the carrier member during positioning or implantation of the carrier member in the subject's body.

2. The device according to claim 1, further including a plurality of FBG sensor arrays configured for measuring position of one or both of the insertion end and the side walls of the carrier member during positioning of the carrier member in the subject's body.

3. The device according to claim 2, wherein the optical fiber is a multi-core optical fiber having a FBG sensor array disposed in each core for providing contact force and/or position measurements at the location of each FBG.

4. The device according to claim 3, wherein the grating pitch of each FBG in the FBG sensor arrays is different to enable reflection wavelengths of the FBGs along each core to be detected individually.

5. The device according to claim 3, wherein the FBG separation in each of the FBG sensor arrays is substantially identical for providing contact force and/or position measurements at the location of each FBG based on variations in reflection spectra of the FBG sensor arrays in each core.

6. The device according to claim 3, wherein the multi-core optical fiber includes a low-index region associated with each core, wherein the low-index region has a lower refractive index than the refractive index of the core and a cladding of the optical fiber for reducing bending loss of optical light during positioning of the carrier member in the subject's body.

7. The device according to claim 6, wherein the low-index region includes one of:
a trench surrounding the core, wherein the trench is air-filled or filled with a fluid having the lower refractive index;
one or more holes surrounding the core, wherein the holes are air-filled or filled with a fluid having the lower refractive index; or
a plurality of elongate members positioned around and colinearly with the core, wherein the elongate members include a material having the lower refractive index.

8. The device according to claim 3, wherein the multi-core optical fiber includes a plurality of holes arranged in a cladding of the optical fiber to induce bending in a desired direction during positioning of the carrier member in the subject's body.

9. The device according to claim 3, wherein the multi-core optical fiber includes a cladding that is shaped to induce bending in a desired direction during positioning of the carrier member in the subject's body, and wherein a cross-section of the cladding includes one or more of the following shapes: circular, rectangular, square, triangular, oval and elliptical.

10. The device according to claim 1, wherein the one or more operative components include at least one electrode array or optical array, and wherein the FBG sensor array is aligned relative to the at least one electrode array or optical array in the carrier member.

11. The device according to claim 1, wherein the device is an implantable medical device and the carrier member is configured for implantation in the subject's body.

12. The device according to claim 1, wherein the device is a cochlear implant device and the one or more operative components include at least one electrode array or optical array for providing stimulation to the nervous system of the subject.

13. The device according to claim 1, wherein the core comprises a first refractive index of 1.531 and the cladding comprises a second refractive index of 1.525.

14. The device according to claim 1 wherein the core comprises an absence of microstructures.

15. A system for guiding positioning or implantation of a medical device in a subject's body, the system including:
a medical device including:
a carrier member configured for positioning or implantation in the subject's body, the carrier member including an insertion end and side walls that contact the subject's body during positioning or implantation of the carrier member in the subject's body;
one or more operative components disposed in the carrier member;
an optical fiber at least partly disposed in the carrier member, the optical fiber comprising a core comprising a first cyclo olefin polymer having a first refractive index and a cladding comprising a second cyclo olefin polymer having a second refractive index that is less than the first refractive index; and
at least one fiber Bragg grating (FBG) sensor array associated with the optical fiber and being disposed in the carrier member;
an interrogator coupled to the optical fiber and configured to obtain reflection spectra data from the FBG sensor array during positioning or implantation of the carrier member in the subject's body; and
a processor configured to receive the reflection spectra data from the interrogator and to process the reflection spectra data to determine contact forces at one or both of the insertion end and along the side walls of the carrier member during positioning or implantation of the carrier member in the subject's body.

16. The system according to claim 15, wherein the device further includes a plurality of FBG sensor arrays, and wherein the processor is further configured to process the reflection spectra data to determine position of one or both of the insertion end and the side walls of the carrier member during positioning of the carrier member in the subject's body.

17. The system according to claim 16, wherein the optical fiber is a multi-core optical fiber including a fiber Bragg grating (FBG) sensor array disposed in each core, and wherein the system further includes a coupling device for coupling each core to the interrogator for separately detecting the reflection spectra of the FBG sensor arrays in each core.

18. The system according to claim 16, wherein the processor is further configured to:
receive position data of a target region of the subject's body prior to positioning of the carrier member in the subject's body; and
process data corresponding to the position of the carrier member relative to the position data of the target region in real-time to provide contact force and/or position information of the carrier member during positioning of the carrier member in the subject's body.

19. The system according to claim 16, wherein the core comprises a first refractive index of 1.531 and the cladding comprises a second refractive index of 1.525.

20. The system according to claim 15, wherein the processor is further configured to detect when the contact forces on the carrier member exceed a threshold value over which damage to internal tissues of the subject's body is likely to occur.

21. The system according to claim 20, wherein when the threshold value is exceeded, the processor is configured to output a notification signal of excessive contact forces on the internal tissues of the subject's body.

22. The system according to claim 15, wherein the medical device is a cochlear implant device and the one or more operative components include at least one electrode array or optical array for providing stimulation to the nervous system of the subject.

23. The system according to claim 22, wherein the processor is further configured to one or both of:
process the data to detect when the contact forces on the carrier member are indicative of fold-over of a tip of the at least one electrode array or optical array; and
output a notification signal of fold-over of the tip.

24. A method for guiding positioning or implantation of a medical device in a subject's body, the method including the steps of:
providing a medical device including:
a carrier member configured for positioning or implantation in the subject's body, the carrier member including an insertion end and side walls that contact the subject's body during positioning or implantation of the carrier member in the subject's body;
one or more operative components disposed in the carrier member;
an optical fiber at least partly disposed in the carrier member, the optical fiber comprising a core comprising a first cyclo olefin polymer having a first refractive index and a cladding comprising a second cyclo olefin polymer having a second refractive index that is less than the first refractive index; and
at least one fiber Bragg grating (FBG) sensor array associated with the optical fiber and being disposed in the carrier member;
positioning the insertion end of the carrier member in the subject's body;
using an interrogator coupled to the optical fiber to obtain reflection spectra data from the FBG sensor array during positioning or implantation of the carrier member in the subject's body; and
determining contact forces at one or both of the insertion end and along the side walls of the carrier member during positioning or implantation of the carrier member in the subject's body based on the reflection spectra data from the interrogator.

25. The method according to claim 24, wherein the core comprises a first refractive index of 1.531 and the cladding comprises a second refractive index of 1.525.

* * * * *